US012181752B2

(12) United States Patent
Peng et al.

(10) Patent No.: US 12,181,752 B2
(45) Date of Patent: Dec. 31, 2024

(54) DISPLAY SUBSTRATE COMPRISING A PLURALITY OF PIXEL STRUCTURES EACH HAVING FIRST AND SECOND ELECTRODE REGIONS AND FIRST AND SECOND LIGHT SHIELDING REGIONS, MANUFACTURING METHOD THEREFOR, AND DISPLAY DEVICE

(71) Applicants: Beijing BOE Technology Development Co., Ltd., Beijing (CN); BOE Technology Group Co., Ltd., Beijing (CN)

(72) Inventors: Yidan Peng, Beijing (CN); Long Wang, Beijing (CN); Guangkui Qin, Beijing (CN); Biqi Li, Beijing (CN)

(73) Assignee: Beijing BOE Technology Development Co., Ltd., Beijing (CN)

( * ) Notice: Subject to any disclaimer, the term of this patent is extended or adjusted under 35 U.S.C. 154(b) by 0 days.

(21) Appl. No.: 18/580,163

(22) PCT Filed: Aug. 15, 2022

(86) PCT No.: PCT/CN2022/112532
§ 371 (c)(1),
(2) Date: Jan. 18, 2024

(87) PCT Pub. No.: WO2023/020440
PCT Pub. Date: Feb. 23, 2023

(65) Prior Publication Data
US 2024/0329466 A1  Oct. 3, 2024

(30) Foreign Application Priority Data

Aug. 19, 2021 (CN) .......................... 202110953899.9

(51) Int. Cl.
*G02F 1/1343* (2006.01)
*G02F 1/1333* (2006.01)
(Continued)

(52) U.S. Cl.
CPC .. *G02F 1/134336* (2013.01); *G02F 1/133354* (2021.01); *G02F 1/133357* (2021.01);
(Continued)

(58) Field of Classification Search
CPC .................. G02F 1/133354; G02F 1/133357
See application file for complete search history.

(56) References Cited

U.S. PATENT DOCUMENTS

2012/0188212 A1  7/2012  Ina et al.
2016/0148552 A1  5/2016  Tian et al.
(Continued)

FOREIGN PATENT DOCUMENTS

CN   102576162 A   7/2012
CN   104020604 A   9/2014
(Continued)

OTHER PUBLICATIONS

International Search Report for PCT/CN2022/112532 Mailed Oct. 21, 2022.
(Continued)

*Primary Examiner* — Paul C Lee
(74) *Attorney, Agent, or Firm* — Ling Wu; Stephen Yang; Ling and Yang Intellectual Property

(57) ABSTRACT

Disclosed is a display substrate, comprising a first substrate (100) and a second substrate (200) which are arranged opposite to each other, and a liquid crystal layer (300) which is arranged between the first substrate (100) and the second substrate (200). The first substrate (100) is provided with a first conductive layer and a first light-shielding layer which comprises a plurality of first light-shielding structures (111),
(Continued)

and the second substrate is provided with a second conductive layer and a second light-shielding layer which comprises a plurality of second light-shielding structures (211). The first conductive layer comprises at least one first electrode (31) and at least one second electrode (32) which are alternately arranged in a second direction. The second conductive layer comprises at least one third electrode (33) arranged in a first direction. The display substrate comprises a plurality of pixel structures.

20 Claims, 15 Drawing Sheets

(51) Int. Cl.
    *G02F 1/1335* (2006.01)
    *G02F 1/1339* (2006.01)
    *G02F 1/1341* (2006.01)

(52) U.S. Cl.
    CPC .... *G02F 1/133512* (2013.01); *G02F 1/13394* (2013.01); *G02F 1/1341* (2013.01); *G02F 1/13439* (2013.01)

(56) References Cited

U.S. PATENT DOCUMENTS

| | | | | |
|---|---|---|---|---|
| 2017/0316251 A1* | 11/2017 | Li | ........................ | G02F 1/1343 |
| 2019/0064580 A1* | 2/2019 | Li | ..................... | G02F 1/134309 |
| 2019/0101788 A1* | 4/2019 | Zhao | ................. | G02F 1/133512 |
| 2019/0235307 A1 | 8/2019 | Wang et al. | | |
| 2020/0081303 A1* | 3/2020 | Wang | .................... | G02F 1/1335 |
| 2020/0142247 A1 | 5/2020 | Zhao et al. | | |
| 2021/0063784 A1 | 3/2021 | Wang et al. | | |

FOREIGN PATENT DOCUMENTS

| | | | | | |
|---|---|---|---|---|---|
| CN | 104376827 | A | | 2/2015 | |
| CN | 104536217 | A | | 4/2015 | |
| CN | 106526942 | A | | 3/2017 | |
| CN | 106802520 | A | | 6/2017 | |
| CN | 107505782 | A | | 12/2017 | |
| CN | 108646481 | A | | 10/2018 | |
| CN | 110531549 | A | | 12/2019 | |
| CN | 110673366 | A | | 1/2020 | |
| CN | 113156682 | A | * | 7/2021 | ........... G02F 1/1333 |
| CN | 113176684 | A | | 7/2021 | |
| JP | H08101400 | A | | 4/1996 | |
| JP | 2001265255 | A | | 9/2001 | |
| JP | 2010286727 | A | | 12/2010 | |
| KR | 10-2016-0043583 | A | | 4/2016 | |
| WO | 2018126730 | A1 | | 7/2018 | |
| WO | 2019024687 | A1 | | 2/2019 | |

OTHER PUBLICATIONS

Office Action dated Mar. 8, 2024 for Chinese Patent Application No. 202110953899.9 and English Translation.

* cited by examiner

US 12,181,752 B2

DISPLAY SUBSTRATE COMPRISING A PLURALITY OF PIXEL STRUCTURES EACH HAVING FIRST AND SECOND ELECTRODE REGIONS AND FIRST AND SECOND LIGHT SHIELDING REGIONS, MANUFACTURING METHOD THEREFOR, AND DISPLAY DEVICE

CROSS-REFERENCE TO RELATED APPLICATIONS

The present application is a U.S. National Phase Entry of International Application No. PCT/CN2022/112532 having an international filing date of Aug. 15, 2022, which claims priority to Chinese Patent Application No. 202110953899.9, filed to the CNIPA on Aug. 19, 2021 and entitled "Display Substrate, Preparation Method therefor, and Display Apparatus", contents of the above-identified applications should be interpreted as being incorporated into the present application by reference.

TECHNICAL FIELD

Embodiments of the present disclosure relate to, but are not limited to, the field of display technologies, and more particularly, to a display substrate, a preparation method therefor, and a display apparatus.

BACKGROUND

A Liquid Crystal Display (LCD for short) has characteristics, such as small volume, low power consumption, and no radiation, and has been developed rapidly. A liquid crystal display panel includes a Thin Film Transistor array (TFT) substrate and a Color Filter (CF) substrate that are cell-aligned, and Liquid Crystal (LC) molecules are disposed between an array substrate and an opposite substrate. By controlling a common electrode and a pixel electrode, an electric field is formed to drive liquid crystal to deflect, thereby achieving gray scale display.

With maturity of liquid crystal display technologies, the liquid crystal display technologies are increasingly applied in transparent display. Transparent display is an important personalized display field of display technologies, which means that a picture is displayed in a transparent state, and a viewer may not only see an image in a display apparatus, but also see a background behind the display apparatus. Transparent display may include single-sided transparent display and double-sided transparent display. The double-sided transparent display may be widely used in transparent show windows, display walls, traffic signs, transparent vehicle display, smart home display, window display, and wearable display and so on, which has a good prospect.

SUMMARY

The following is a summary of subject matter described herein in detail. The summary is not intended to limit the protection scope of claims.

In a first aspect, the present disclosure provides a display substrate including a first substrate and a second substrate disposed oppositely, and a liquid crystal layer disposed between the first substrate and the second substrate; a first light shielding layer and a first conductive layer are disposed on a side of the first substrate close to the second substrate, wherein the first conductive layer is located on a side of the first light shielding layer close to the second substrate; a second light shielding layer and a second conductive layer are disposed on a side of the second substrate close to the first substrate, wherein the second conductive layer is located on a side of the second light shielding layer close to the first substrate.

The first conductive layer includes a plurality of first electrode regions arranged in an array, and each of the first electrode regions includes at least one first electrode arranged along a second direction and at least one second electrode arranged along the second direction, wherein the first electrode and the second electrode extend along a first direction, and at least one first electrode and at least one second electrode are alternately disposed.

The second conductive layer includes a plurality of second electrode regions arranged in an array, and each of the second electrode regions includes at least one third electrode arranged along the first direction, the third electrode extends along the second direction, wherein the first direction intersects with the second direction.

The first light shielding layer includes a plurality of first light shielding regions arranged in an array, and each of the first light shielding regions includes a plurality of first light shielding structures arranged in an array.

The second light shielding layer includes a plurality of second light shielding regions arranged in an array, and each of the second light shielding regions includes a plurality of second light shielding structures arranged in an array.

The display substrate includes a plurality of pixel structures arranged in an array, and each of the pixel structures includes the first electrode region, the second electrode region, the first light shielding region, and the second light shielding region.

For each pixel structure, an orthographic projection of the first light shielding structure on the first substrate is at least partially overlapped with a first overlapping region, and an orthographic projection of the second light shielding structure on the first substrate is at least partially overlapped with a second overlapping region; and the first overlapping region is an overlapping region between orthographic projections of a plurality of first electrodes and a plurality of third electrodes on the first substrate, and the second overlapping region is an overlapping region between orthographic projections of a plurality of second electrodes and a plurality of third electrodes on the first substrate.

In an exemplary implementation mode, for each pixel structure, the first overlapping region is located within a range of the orthographic projection of the first light shielding structure on the first substrate, and the second overlapping region is located within a range of the orthographic projection of the second light shielding structure on the first substrate.

In an exemplary implementation mode, each of the first electrode regions further includes a first connection electrode extending along the second direction and a second connection electrode extending along the second direction.

For each pixel structure, the first connection electrode is connected with the plurality of first electrodes, and is of an integral structure with the plurality of first electrodes; and the second connection electrode is connected with the plurality of second electrodes, and is of an integral structure with the plurality of second electrodes.

In an exemplary implementation mode, for each pixel structure, a region in which the first electrode, the second electrode, and the third electrode are arranged constitutes a display region, and orthographic projections of the first connection electrode and the second connection electrode on the first substrate are not overlapped with an orthographic projection of the display region on the first substrate; or the first connection electrode and the second connection electrode are disposed on the first substrate and in a region between orthographic projections of two adjacent third electrodes that are located on the second substrate on the first substrate.

In an exemplary implementation mode, the first substrate is further provided with a third conductive layer; the third conductive layer is located on a side of the first light shielding layer away from the second substrate.

The third conductive layer includes a plurality of signal drive regions arranged in an array, and each of the signal drive regions includes a first drive signal line and a second drive signal line extending along the second direction.

For each pixel structure, the first drive signal line is electrically connected with the plurality of first electrodes, and the second drive signal line is electrically connected with the plurality of second electrodes.

In an exemplary implementation mode, the first substrate is further provided with a first planarization layer, an insulation layer, and a first alignment layer, wherein the first planarization layer is located between the first conductive layer and the first light shielding layer, the insulation layer is located between the first light shielding layer and the third conductive layer, and the first alignment layer is located on a side of the first conductive layer close to the second substrate.

The first planarization layer and the insulation layer are provided with a first via exposing the first drive signal line and a second via exposing the second drive signal line.

For each pixel structure, the plurality of first electrodes are connected with the first drive signal line through the first via, and the plurality of second electrodes are connected with the second drive signal line through the second via.

In an exemplary implementation mode, for each pixel structure, there is no overlapping region between orthographic projections of the first via and the second via on the first substrate and the orthographic projection of the first light shielding structure on the first substrate.

In an exemplary implementation mode, lengths of the first via and the second via along the first direction are 5 microns to 20 microns; lengths of the first via and the second via along the second direction are 5 microns to 20 microns.

A quantity of first vias is plural, and a quantity of second vias is plural.

For each pixel structure, each of the first electrodes is electrically connected with the first drive signal line through at least one of the first vias; and each of the second electrodes is electrically connected with the second drive signal line through at least one of the second vias.

In an exemplary implementation mode, for each pixel structure, distances between adjacent first electrodes are equal and distances between adjacent second electrodes are equal.

In an exemplary implementation mode, for each pixel structure, distances between adjacent third electrodes are equal.

In an exemplary implementation mode, for each pixel structure, the second electrode is located between two adjacent first electrodes; and the first electrode is located between two adjacent second electrodes.

In an exemplary implementation mode, the display substrate further includes a post spacer disposed between the first substrate and the second substrate, wherein the post spacer is disposed to support the first substrate and the second substrate.

In an exemplary implementation mode, the second substrate is further provided with a second planarization layer and a second alignment layer, wherein the second planarization layer is located between the second light shielding layer and the second conductive layer, and the second alignment layer is located on a side of the second conductive layer close to the first substrate.

In an exemplary implementation mode, shapes of the first electrode and the second electrode include strip shapes, and a shape of the third electrode includes a strip shape; lengths of the first electrode and the second electrode along the second direction are 80 microns to 100 microns; and a length of the third electrode along the first direction is 80 microns to 100 microns.

In an exemplary implementation mode, lengths of the first light shielding structure and the second light shielding structure along the first direction are 90 microns to 120 microns, and lengths of the first light shielding structure and the second light shielding structure along the second direction are 90 microns to 120 microns.

In an exemplary implementation mode, a length of the first electrode along the second in direction is smaller than a length of the first light shielding structure along the second direction by 5 microns to 30 microns, and the length of the third electrode along the first direction is smaller than a length of the first light shielding structure along the first direction by 5 microns to 30 microns.

In an exemplary implementation mode, a length of the second electrode along the second direction is smaller than a length of the second light shielding structure along the second direction by 5 microns to 30 microns, and the length of the third electrode along the first direction is smaller than a length of the second light shielding structure along the first direction by 5 microns to 30 microns.

In an exemplary implementation mode, the liquid crystal layer is a polymer stabilized liquid crystal layer.

In an exemplary implementation mode, the first electrode, the second electrode, and the third electrode are transparent electrodes.

In an exemplary implementation mode, for each pixel structure, a sum of areas of all the first light shielding structures and all the second light shielding structures is 15% to 35% of a total area of one pixel structure.

In an exemplary implementation mode, the first light shielding layer further includes a third light shielding region, and the second light shielding layer further includes a fourth light shielding region; the third light shielding region and the fourth light shielding region are located between adjacent pixel structures, wherein the third light shielding region includes a plurality of third light shielding structures arranged in an array, and the fourth light shielding region includes a plurality of fourth light shielding structures arranged in an array.

Orthographic projections of a plurality of third light shielding structures on the first substrate are not overlapped with an orthographic projection of a pixel structure on the first substrate, and orthographic projections of a plurality of fourth light shielding structures on the first substrate are not overlapped with the orthographic projection of the pixel structure on the first substrate.

In an exemplary implementation mode, fabrication materials of the first light shielding structure, the second light shielding structure, the third light shielding structure, and the fourth light shielding structure include optical resin, black resin, or chromium.

In a second aspect, the present disclosure also provides a display apparatus, including the above display substrate.

In a third aspect, the present disclosure provides a preparation method of a display substrate, including following acts.

A first substrate is provided.

A first light shielding layer and a first conductive layer are formed sequentially on the first substrate; the first conductive layer includes a plurality of first electrode regions arranged in an array, and each of the first electrode regions includes at least one first electrode arranged along a second direction and at least one second electrode arranged along the second direction, wherein the first electrode and the second electrode extend along a first direction, and the at least one first electrode and the at least one second electrode are alternately disposed; the first light shielding layer includes a plurality of first light shielding regions arranged in an array, and each of the first light shielding regions includes a plurality of first light shielding structures arranged in an array.

A second substrate is provided.

A second light shielding layer and a second conductive layer are formed sequentially on the second substrate; the second conductive layer includes a plurality of second electrode regions arranged in an array, and each of the second electrode regions includes at least one third electrode arranged along a first direction, and the third electrode extends along the second direction, wherein the first direction intersects with the second direction; the second light shielding layer includes a plurality of second light shielding regions arranged in an array, and each of the second light shielding regions includes a plurality of second light shielding structures arranged in an array.

A liquid crystal layer is disposed on the first substrate on which the first light shielding layer and the first conductive layer are formed or on the second substrate on which the second light shielding layer and the second conductive layer are formed.

The first substrate and the second substrate are cell aligned to form the display substrate, the display substrate includes a plurality of pixel structures arranged in an array, and each of the pixel structures includes the first electrode region, the second electrode region, the first light shielding region, and the second light shielding region; for each pixel structure, an orthographic projection of the first light shielding structure on the first substrate is at least partially overlapped with a first overlapping region, and an orthographic projection of the second light shielding structure on the first substrate is at least partially overlapped with a second overlapping region; and the first overlapping region is an overlapping region between orthographic projections of a plurality of first electrodes and a plurality of third electrodes on the first substrate, and the second overlapping region is an overlapping region between orthographic projections of a plurality of second electrodes and a plurality of third electrodes on the first substrate.

Other aspects may be understood upon reading and understanding of the drawings and detailed description.

BRIEF DESCRIPTION OF DRAWINGS

Accompanying drawings are intended to provide a further understanding of technical solutions of the present disclosure and constitute a part of the specification, and are used for explaining the technical solutions of the present disclosure together with the embodiments of the present disclosure, and do not constitute limitations on the technical solutions of the present disclosure. A shape and a size of each component in the drawings do not reflect actual scales, and are only intended to schematically illustrate contents of the present disclosure.

DETAILED DESCRIPTION

Figure 1A:
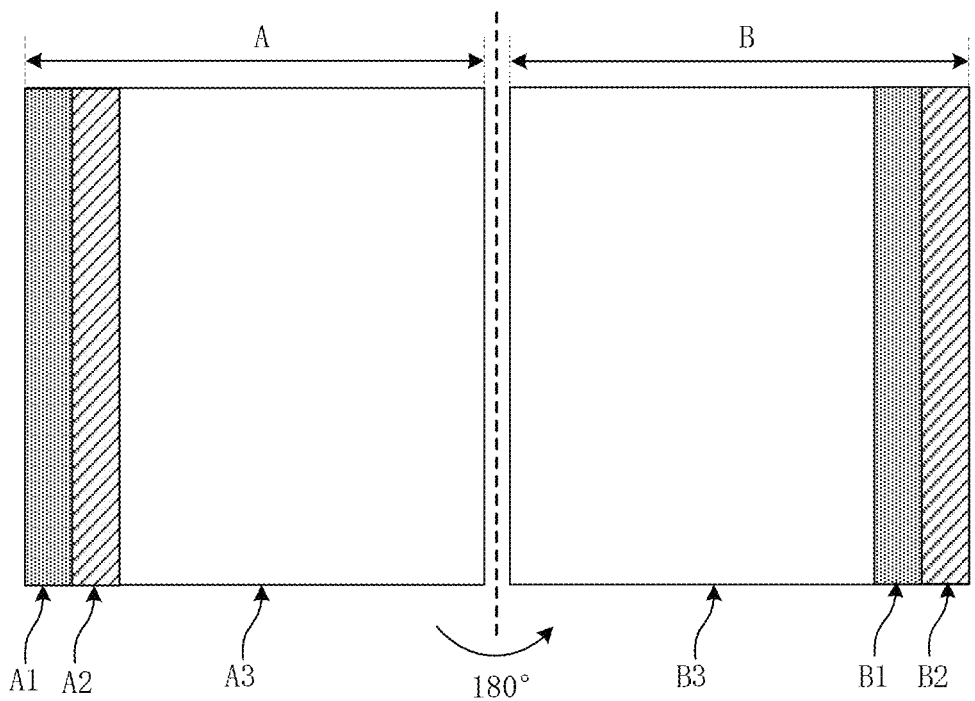
FIG. 1a is a schematic diagram of a planar structure of a pixel structure.

The embodiments of the present disclosure will be described in detail below with reference to the drawings. Implementation modes may be implemented in multiple different forms. Those of ordinary skills in the art may easily understand such a fact that modes and contents may be transformed into various forms without departing from the purpose and scope of the present disclosure. Therefore, the present disclosure should not be explained as being limited to contents described in following implementation modes only. The embodiments in the present disclosure and features in the embodiments may be combined randomly with each other if there is no conflict. In order to keep following description of the embodiments of the present disclosure clear and concise, detailed description of part of known functions and known components are omitted in the present disclosure. The drawings of the embodiments of the present disclosure relate only to structures involved in the embodiments of the present disclosure, and other structures may be described with reference to conventional designs.

Scales of the drawings in the present disclosure may be used as a reference in actual processes, but are not limited thereto. For example, a width-to-length ratio of a channel, a thickness and a pitch of every film layer, and a width and a pitch of every signal line may be adjusted according to an actual situation. A quantity of pixels in a display substrate and a quantity of sub-pixels in each pixel are not limited to numbers shown in the drawings. The drawings described in the present disclosure are schematic structural diagrams only, and one mode of the present disclosure is not limited to shapes, numerical values, or the like shown in the drawings.

Ordinal numerals such as "first", "second", and "third" in the specification are set to avoid confusion between constituent elements, but not to set a limit in quantity.

In the specification, for convenience, wordings indicating orientation or positional relationships, such as "middle", "upper", "lower", "front", "back", "vertical", "horizontal", "top", "bottom", "inside", and "outside", are used for illustrating positional relationships between constituent elements with reference to the drawings, and are merely for facilitating the description of the specification and simplifying the description, rather than indicating or implying that a referred apparatus or element must have a particular orientation and be constructed and operated in the particular orientation. Therefore, they cannot be understood as limitations on the present disclosure. The positional relationships between the constituent elements are changed as appropriate according to a direction which is used for describing each constituent element. Therefore, appropriate replacements may be made according to situations without being limited to the wordings described in the specification.

In the specification, unless otherwise specified and defined explicitly, terms "mount", "mutually connect", and "connect" should be understood in a broad sense. For example, a connection may be a fixed connection, or a detachable connection, or an integrated connection; it may be a mechanical connection or an electrical connection; and it may be a direct mutual connection, or an indirect connection through middleware, or internal communication between two elements. Those of ordinary skills in the art may understand specific meanings of these terms in the present disclosure according to specific situations.

In the specification, an "electrical connection" includes a case that constituent elements are connected together through an element with a certain electrical effect. The "element with a certain electrical effect" is not particularly limited as long as electrical signals may be sent and received between the connected constituent elements. Examples of the "element with a certain electrical effect" not only include an electrode and a wiring, but also include a switching element such as a transistor, a resistor, an inductor, a capacitor, and another element with various functions, etc.

In the specification, "parallel" refers to a state in which an angle formed by two straight lines is −10° or more and 10° or less, and thus also includes a state in which the angle is −5° or more and 5° or less. In addition, "perpendicular" refers to a state in which an angle formed by two straight lines is 80° or more and 100° or less, and thus also includes a state in which the angle is 85° or more and 95° or less.

In the specification, a "film" and a "layer" are interchangeable. For example, a "conductive layer" may be replaced with a "conductive film" sometimes. Similarly, an "insulation film" may be replaced with an "insulation layer" sometimes.

A triangle, rectangle, trapezoid, pentagon, or hexagon, etc. in the specification is not strictly defined, and it may be an approximate triangle, rectangle, trapezoid, pentagon, or hexagon, etc. There may be some small deformations caused by tolerance, and there may be a chamfer, an arc edge, deformation, etc.

In the present disclosure, "about" refers to that a boundary is not defined so strictly and numerical values within process and measurement error ranges are allowed.

Figure 1B:
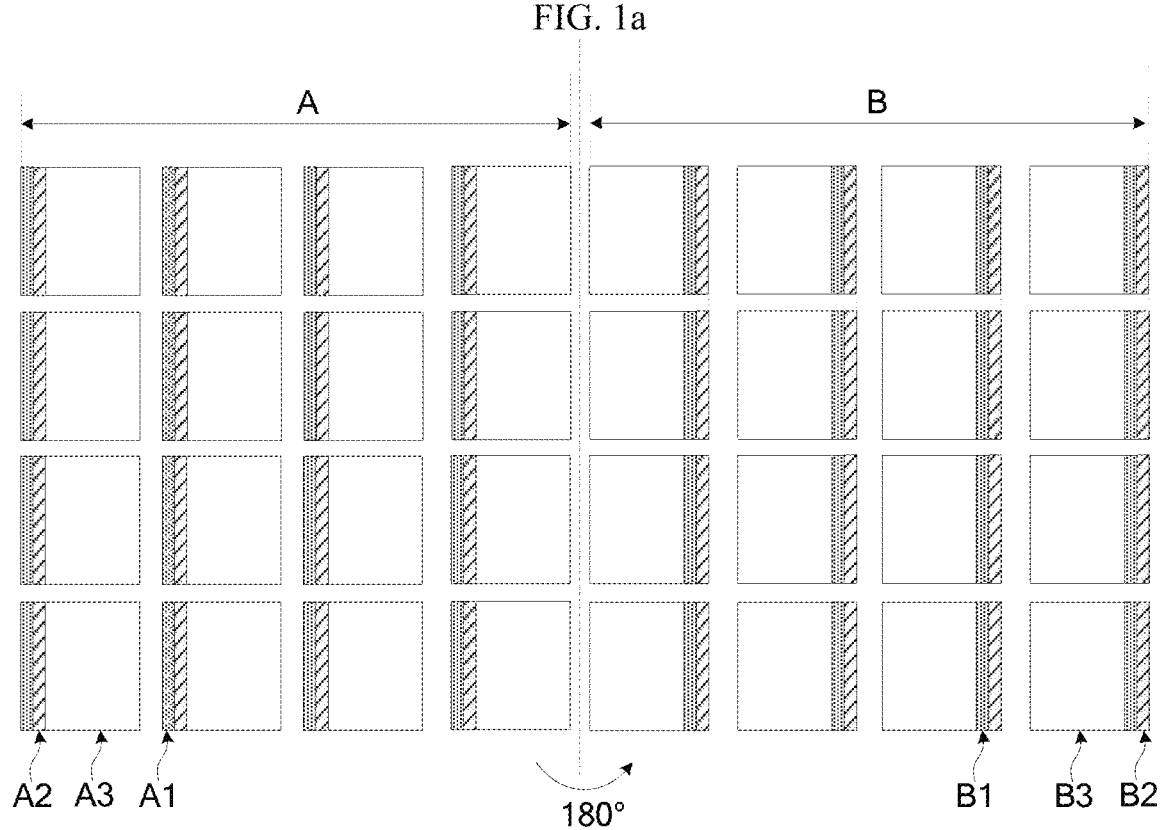
FIG. 1b is a schematic diagram of a planar structure of a double-sided transparent display panel.

Double-sided transparent display is a display technology in which different pictures may be displayed on both sides of a display screen at the same time without affecting each other. Space may be used more efficiently in applications, achieving a multi-functional display effect. An existing double-sided transparent display panel is based on a Polymer Stabilized Liquid Crystal (PSLC for short) material system, which has the advantages of high transparency, a fast response speed, color display, etc. Polymer Stabilized Liquid Crystal is adopted in a liquid crystal cell and a side-incident light mode is adopted, and the liquid crystal cell also plays a role of guiding light while displaying. When displaying is needed, a voltage will be applied to a display region of the liquid crystal cell, so that liquid crystal deflects and scatters light to achieve a display function; and when the screen does not need to be displayed, no voltage is applied to both sides of the liquid crystal cell, showing a transparent state. In order to achieve double-sided display of different pictures and different colors, part of scattered light needs to be controlled or absorbed, a shielding region is disposed in a double-sided display apparatus for shielding, and enough transparent regions need to be reserved in order to ensure a transmittance of more than 60%; as shown in FIG. 1a and FIG. 1b, which are schematic diagrams of a pixel structure of a double-sided transparent display panel, FIG. 1a is a schematic diagram of a single pixel structure of the double-sided transparent display panel, and FIG. 1b is a schematic diagram of a planar structure of a double-sided transparent display panel with 4*4 pixels; a surface A and a surface B are two display surfaces of double-sided display, and the surface A is the surface B is obtained after rotating by 180°; a display region A1 of the surface A and a shielding region B2 of the surface B coincide, a shielding region A2 of the surface A and a display region B1 of the surface B coincide, and a transparent region A3 of the surface A and a transparent region B3 of the surface B coincide. The double-sided transparent display panel is designed in this way, when the surface A is displayed, only one long strip of the display region A1 can be displayed, and a black shielding region A2 will be seen; and similarly, when the surface B is displayed, only one along strip of the B1 display region can be displayed, and a black shielding region B2 will be seen. Practical use shows that an area of a display region of each display surface of this double-sided display structure accounts for about 10% to 20%, and remaining about 60% to 80% is a non-display transparent region or a metal wiring region, that is, in the structure shown in FIG. 1a to FIG. 1b, no matter whether it is A-surface display or B-surface display, although a transmittance is improved, only one long strip is displayed on each display surface, and a black shielding region may be seen visually, resulting in a poor visual effect of double-sided display.

As described above, in the transparent display panel shown in FIG. 1a to FIG. 1b, which is a double-sided transparent display panel driven passively, when displaying, a long black rectangle may be seen, which makes a display effect of the transparent display panel poor.

An embodiment of the present disclosure provides a display substrate, as shown in FIG. 2a to FIG. 2f, including a first substrate 100 and a second substrate 200 disposed oppositely, and a liquid crystal layer 300 disposed between the first substrate 100 and the second substrate 200; a first light shielding layer and a first conductive layer are disposed on a side of the first substrate 100 close to the second substrate 200, wherein the first conductive layer is located on a side of the first light shielding layer close to the second substrate 200; a second light shielding layer and a second conductive layer are disposed on a side of the second substrate 200 close to the first substrate 100, wherein the second conductive layer is located on a side of the second light shielding layer close to the first substrate 100.

The first conductive layer includes a plurality of first electrode regions arranged in an array, and each of the first electrode regions includes at least one first electrode 31 arranged along a second direction and at least one second electrode 32 arranged along the second direction, wherein the first electrode 31 and the second electrode 32 extend along a first direction, and at least one first electrode 31 and at least one second electrode 32 are alternately disposed.

The second conductive layer includes a plurality of second electrode regions arranged in an array, and each of the second electrode regions includes at least one third electrode 33 arranged along the first direction, the third electrode 33 extends along the second direction, wherein the first direction intersects with the second direction.

The first light shielding layer includes a plurality of first light shielding regions arranged in an array, and each of the first light shielding regions includes a plurality of first light shielding structures 111 arranged in an array.

The second light shielding layer includes a plurality of second light shielding regions arranged in an array, and each of the second light shielding regions includes a plurality of second light shielding structures 211 arranged in an array.

The display substrate includes a plurality of pixel structures arranged in an array, and each of the pixel structures includes the first electrode region, the second electrode region, the first light shielding region, and the second light shielding region.

For each pixel structure, an orthographic projection of a first light shielding structure 111 on the first substrate 100 is at least partially overlapped with a first overlapping region, and an orthographic projection of a second light shielding structure 211 on the first substrate 100 is at least partially overlapped with a second overlapping region; and the first overlapping region is an overlapping region of orthographic projections of a plurality of first electrodes 31 and a plurality of third electrodes 33 on the first substrate 100, and the second overlapping region is an overlapping region of orthographic projections of a plurality of second electrodes 32 and a plurality of third electrodes 33 on the first substrate 100.

A display substrate according to an exemplary embodiment of the present disclosure includes a plurality of pixel structures arranged in an array, a plurality of first light shielding structures 111 are disposed on the first substrate 100, and a plurality of second light shielding structures 211 are disposed on the second substrate 200; in a region corresponding to each pixel structure, orthographic projections of a plurality of first electrodes 31 on the first substrate 100 and a plurality of third electrodes 33 on the second substrate 200 are at least partially overlapped with the orthographic projection of the first light shielding structure 111 on the first substrate 100, orthographic projections of a plurality of second electrodes 32 on the first substrate 100 and a plurality of third electrodes 33 on the second substrate 200 are at least partially overlapped with the orthographic projection of the second light shielding structure 211 on the first substrate 100, and the first electrodes 31 and the second electrodes 32 are alternately disposed, so that the display substrate may have a better visual effect of double-sided display.

Figure 2A:
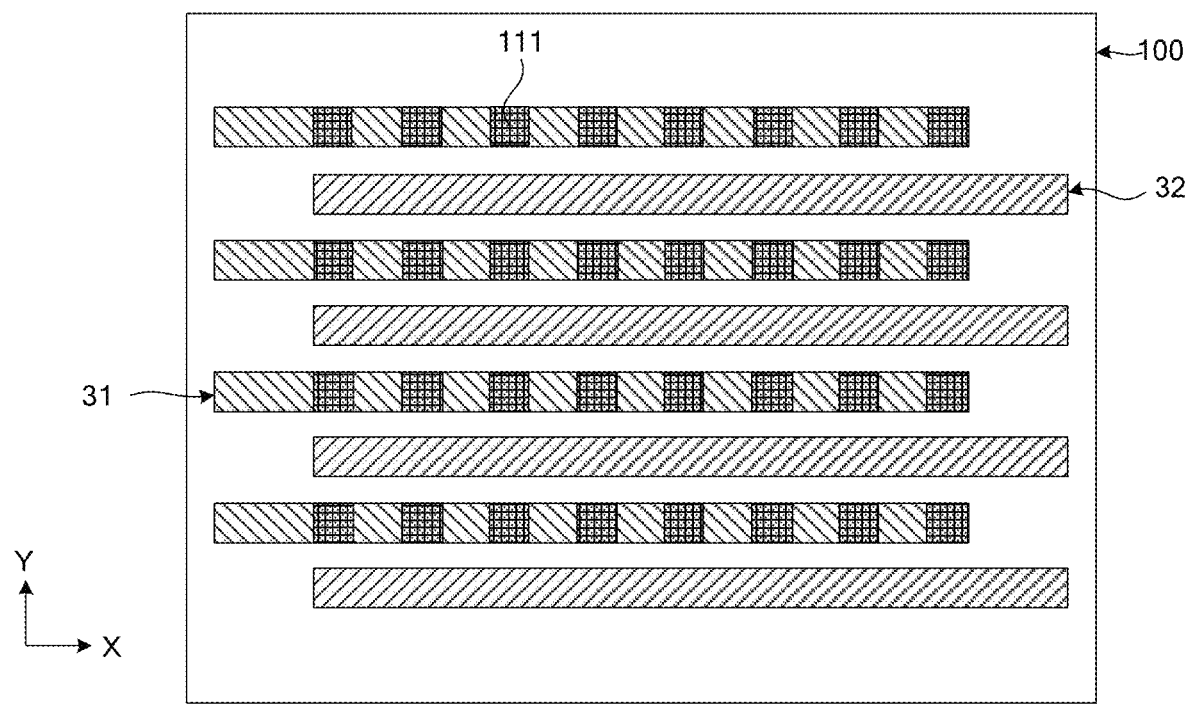
FIG. 2a is a schematic diagram of a planar structure of a first substrate in a display substrate according to an embodiment of the present disclosure.
Figure 2B:
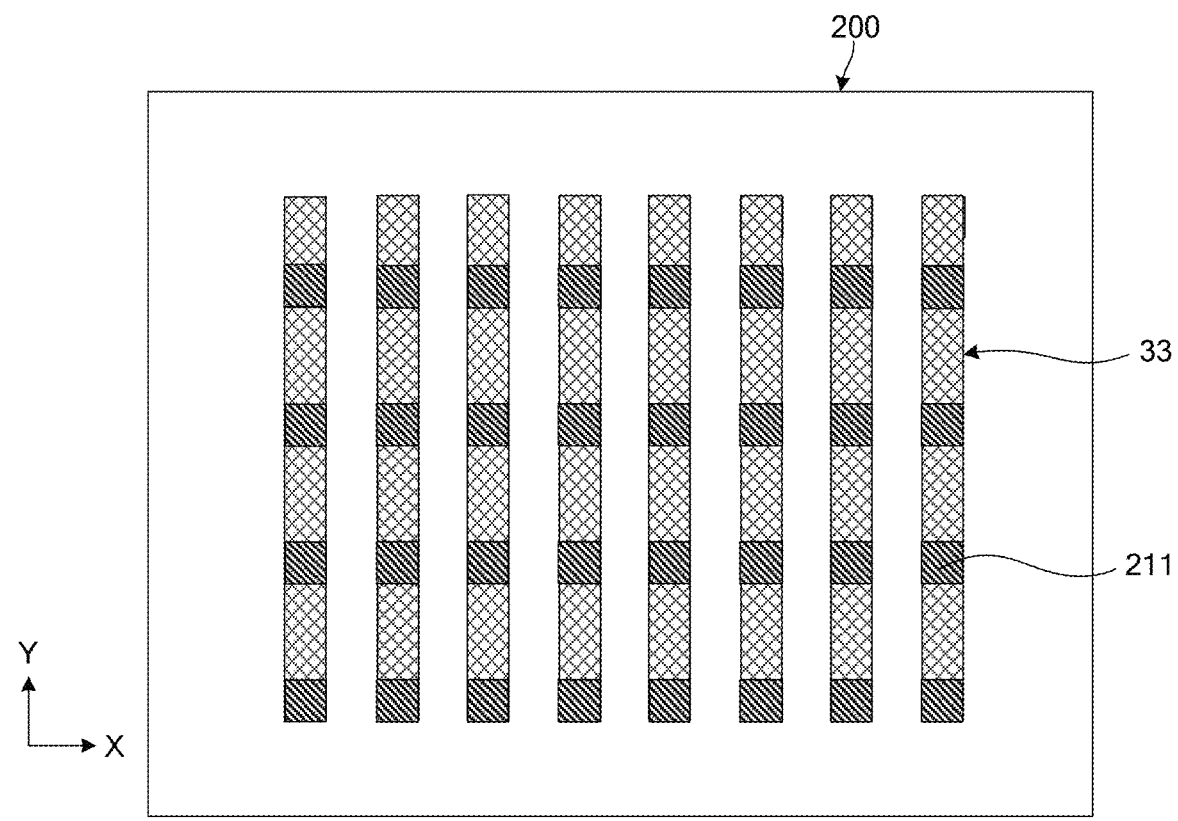
FIG. 2b is a schematic diagram of a planar structure of a second substrate in a display substrate according to an embodiment of the present disclosure.
Figure 2C:
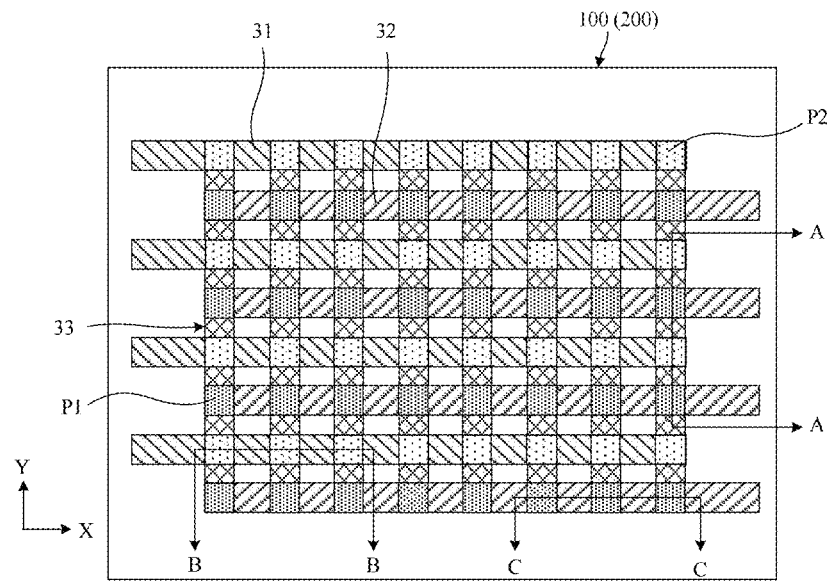
FIG. 2c is a schematic diagram of a planar structure of a display substrate according to an embodiment of the present disclosure.
Figure 2D:
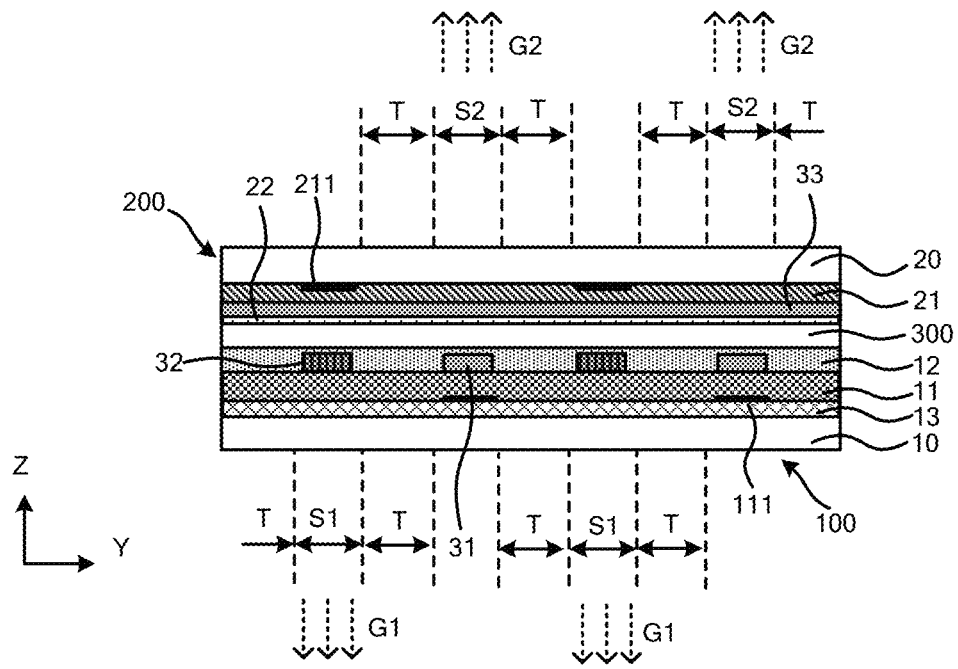
FIG. 2d to FIG. 2f are cross-sectional views of a display substrate according to an embodiment of the present disclosure.
Figure 2E:
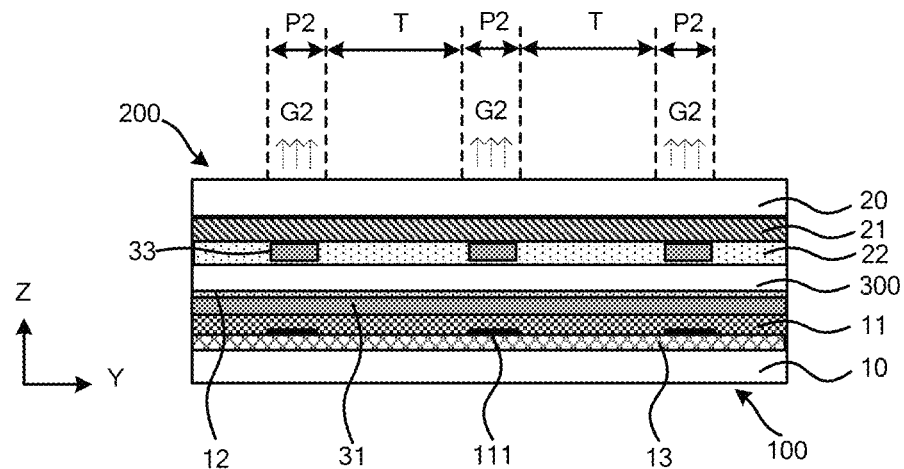
Figure 2F:
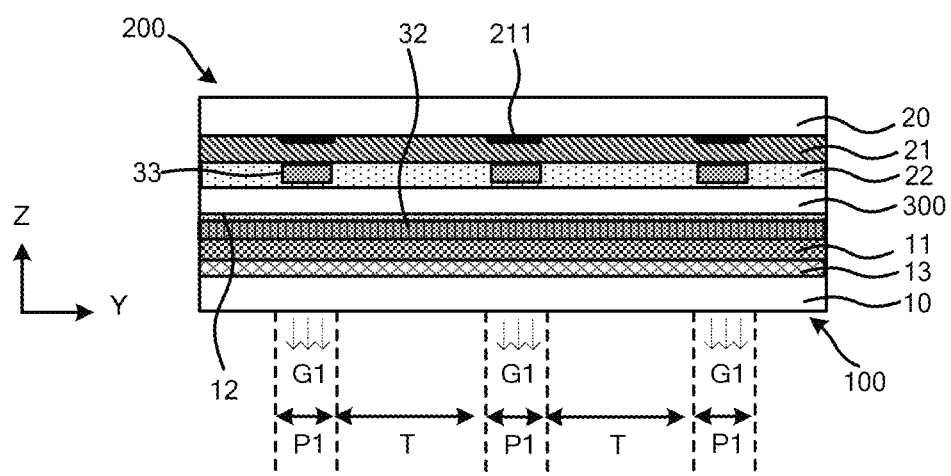

FIG. 2a to FIG. 2c are schematic diagrams of a planar structure of a region corresponding to one pixel structure in the display substrate, and FIG. 2a is a schematic diagram of a planar structure of an arrangement mode of a first electrode 31, a second electrode 32, and a first light shielding structure 111 on the first substrate 100; FIG. 2b is a schematic diagram of a planar structure of an arrangement mode of a third electrode 33 and a second light shielding structure 211 on the second substrate 200; FIG. 2c is a schematic diagram of a planar structure of an arrangement mode of a first electrode 31, a second electrode 32, a third electrode 33, a first overlapping region, and a second overlapping region in the pixel structure; FIG. 2d is a cross-sectional view along an A-A direction in FIG. 2c; FIG. 2e is a cross-sectional view along a B-B direction in FIG. 2c, and FIG. 2f is a cross-sectional view along a C-C direction in FIG. 2c.

In a display substrate according to an exemplary embodiment of the present disclosure, as shown in FIG. 2c to FIG. 2f, in each pixel structure, a plurality of first overlapping regions define a plurality of second sub-pixels P2, and a plurality of second overlapping regions define a plurality of first sub-pixels P1. In a display substrate according to an exemplary embodiment of the present disclosure, first sub-pixels P1 arranged along an extension direction (a first direction X) of a second electrode 32 and second sub-pixels P2 arranged along an extension direction (the first direction X) of a first electrode 31 are alternately arranged in a second direction Y, thereby avoiding that each display surface has only local region display and also avoiding a black shielding region exists on each display surface in a visual effect of double-sided display. No shielding structure is disposed in a region other than the first overlapping region and the second overlapping region of the display substrate, which may ensure that the display substrate has a relatively high transmittance.

In an exemplary implementation mode, for each pixel structure, the first overlapping region may be located within a range of an orthographic projection of the first light shielding structure 111 on the first substrate 100, and the second overlapping region may be located within a range of an orthographic projection of the second light shielding structure 211 on the first substrate 100.

In an exemplary implementation mode, for each pixel structure, the first overlapping region is located within a range of an orthographic projection of the first light shielding structure 111 on the first substrate 100, such that the first light shielding structure 111 may cover the first overlapping region, and the second overlapping region is located within a range of an orthographic projection of the second light shielding structure 211 on the first substrate 100, such that the second light shielding structure 211 may cover the second overlapping region, which may enable that when the display substrate is working, the first overlapping region will not leak light on a side of the first substrate 100 away from the second substrate 200 through shielding of the first light shielding structure 111 and the second overlapping region will not leak light on a side of the second substrate 200 away from the first substrate 100 through shielding of the second light shielding structure 211, thereby improving a visual effect of double-sided display of the display substrate.

Figure 3A:
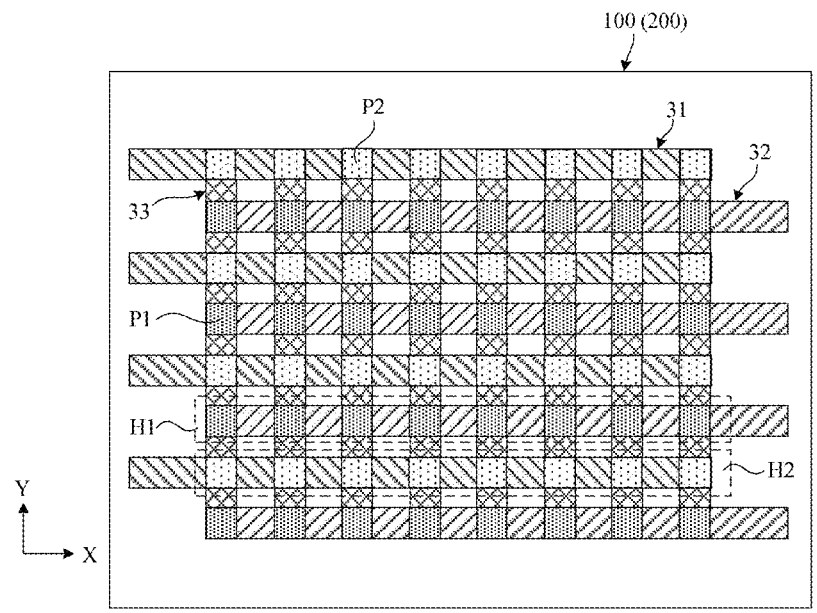
FIG. 3a to FIG. 3c are schematic diagrams of a planar structure of a display substrate according to an exemplary embodiment.
Figure 3B:
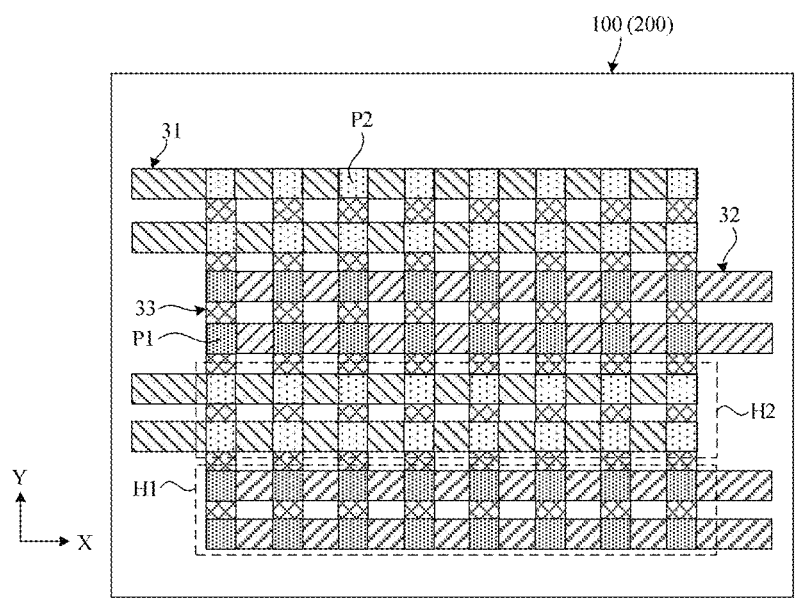
Figure 3C:
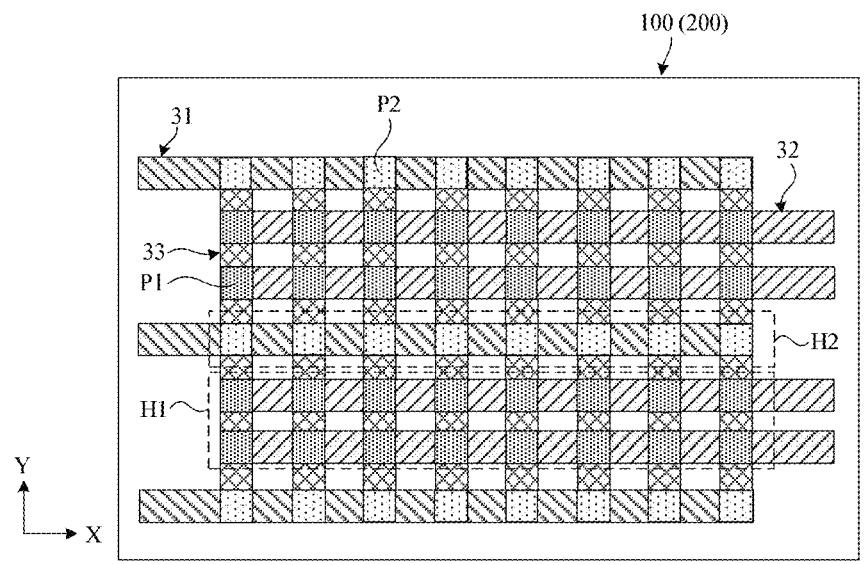

In an exemplary implementation mode, as shown in FIG. 3a to FIG. 3c, which are schematic diagrams of a planar structure of a region corresponding to one pixel structure in the display substrate, and in each pixel structure, a first sub-pixel region H1 constituted by a first sub-pixel P1 corresponding to at least one second electrode 32 and a second sub-pixel region H2 constituted by a second sub-pixel P2 corresponding to at least one first electrode 31 are alternately disposed along the second direction Y.

In an exemplary implementation mode, for each pixel structure, the first sub-pixel region H1 may be constituted by a first sub-pixel P1 corresponding to at least one adjacent second electrode 32, and the pixel structure is not provided with a second electrode 32 and a second sub-pixel P2 within a range in which the first sub-pixel region H1 is located; and the second sub-pixel region H2 may be constituted by a second sub-pixel P2 corresponding to at least one adjacent first electrode 31, and the pixel structure is not provided with a first electrode 31 and a first sub-pixel P1 within a range in which the second sub-pixel region H2 is located.

As shown in FIG. 3a, for each pixel structure, each first sub-pixel region H1 may be constituted by a plurality of first sub-pixels P1 corresponding to one second electrode 32, each second sub-pixel region H2 may be constituted by a plurality of second sub-pixels P2 corresponding to one first electrode 31, and the first sub-pixel region H1 and the second sub-pixel region H2 are alternately disposed along the second direction Y.

As shown in FIG. 3b, for each pixel structure, each first sub-pixel region H1 may be constituted by a plurality of first sub-pixels P1 corresponding to two second electrodes 32, each second sub-pixel region H2 may be constituted by a plurality of second sub-pixels P2 corresponding to two first electrodes 31, and the first sub-pixel region H1 and the second sub-pixel region H2 are alternately disposed along the second direction Y.

As shown in FIG. 3c, for each pixel structure, each first sub-pixel region H1 may be constituted by a plurality of first sub-pixels P1 corresponding to two second electrodes 32, each second sub-pixel region H2 may be constituted by a plurality of second sub-pixels P2 corresponding to one first electrode 31, and the first sub-pixel region H1 and the second sub-pixel region H2 are alternately disposed along the second direction Y.

In an exemplary implementation mode, for each pixel structure, a quantity of second electrodes 32 in the first sub-pixel region H1 and a quantity of first electrodes 31 in the second sub-pixel region H2 may be set in other ways, which is not limited here in the present disclosure.

Figure 4A:
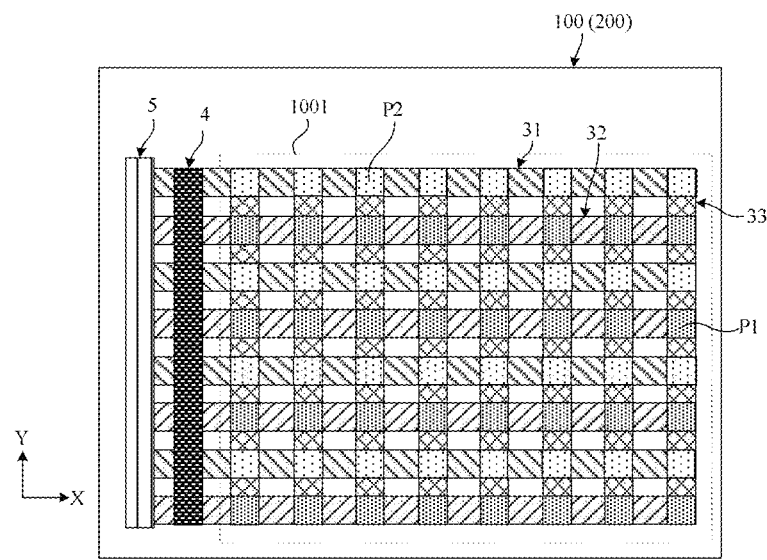
FIG. 4a to FIG. 4e are schematic diagrams of a planar structure of a display substrate according to another exemplary embodiment.

In an exemplary implementation mode, for each pixel structure, as shown in FIG. 4a, an auxiliary connection electrode 4 may be disposed in each first electrode region of a first conductive layer 11, and for each pixel structure, the auxiliary connection electrode 4 may be electrically connected with a first electrode 31 and a second electrode 32.

In an exemplary implementation mode, the auxiliary connection electrode 4, the first electrode 31, and the second electrode 32 may be fabricated through a one-time patterning process, and after a plurality of first electrodes 31 and a plurality of second electrodes 32 are connected through the auxiliary connection electrode 4, resistance values of the plurality of first electrodes 31 and the plurality of second electrodes 32 may be reduced.

Figure 4B:
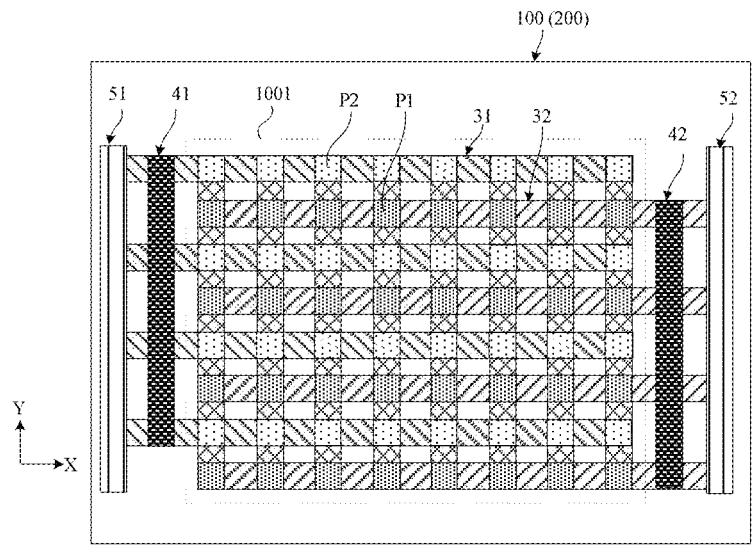
Figure 4C:
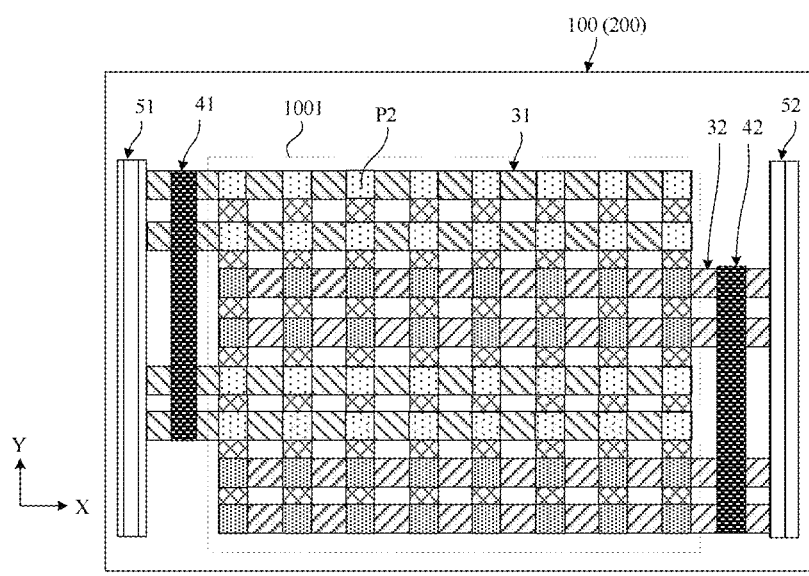
Figure 4D:
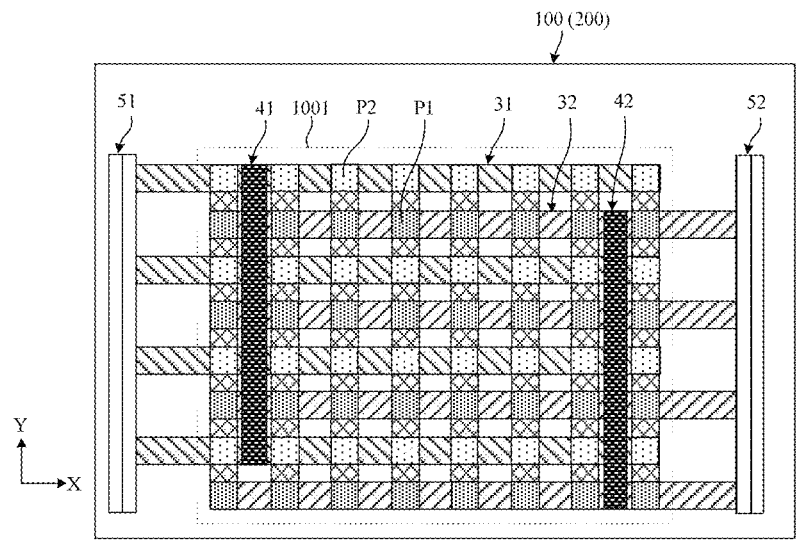

In an exemplary implementation mode, for each pixel structure, as shown in FIG. 4b to FIG. 4d, the auxiliary connection electrodes 4 disposed on each first electrode region of the first conductive layer may include a first connection electrode 41 extending along the second direction Y and a second connection electrode 42 extending along the second direction. Herein, for each pixel structure, the first connection electrode 41 is connected with a plurality of first electrodes 31 and is of an integral structure structure with the plurality of first electrodes 31; and the second connection electrode 42 is connected with a plurality of second electrodes 32 and is of an integral structure with the plurality of second electrodes 32.

In an exemplary implementation mode, for each pixel structure, the first connection electrode 41 is of the integral structure with the plurality of first electrodes 31, which may reduce a fabrication process and save a fabrication cost.

In an exemplary implementation mode, for each pixel structure, the second connection electrode 42 is of the integral structure with the plurality of second electrodes 32, which may reduce a fabrication process and save a fabrication cost.

Figure 4E:
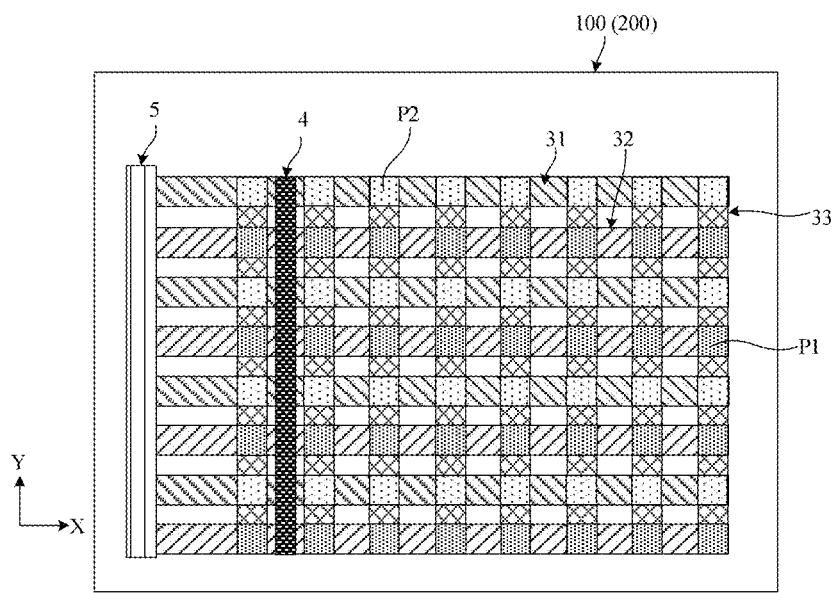

In an exemplary implementation mode, for each pixel structure, as shown in FIG. 4a and FIG. 4e, the auxiliary connection electrode 4, the first electrode 31, and the second electrode 32 may be of an integral structure, which may reduce a fabrication process and save a fabrication cost.

In an exemplary implementation mode, for each pixel structure, as shown in FIG. 4a to FIG. 4c, a region in which a first electrode 31, a second electrode 32, and a third electrode 33 are arranged constitutes a display region 1001, and there is no overlapping region between an orthographic projection of the auxiliary connection electrode 4 on the first substrate 100 and an orthographic projection of the display region 1001 on the first substrate 100.

In an exemplary implementation mode, for each pixel structure, as shown in FIG. 4d to FIG. 4e, the auxiliary connection electrode 4 may be disposed on the first substrate 100 in a region between orthographic projections of two adjacent third electrodes 33 located on the second substrate 200 on the first substrate 100.

In an exemplary implementation mode, as shown in FIG. 4a to FIG. 4e, the first substrate 100 is further provided with a third conductive layer; the third conductive layer is located on a side of the first light shielding layer away from the second substrate 200; and the third conductive layer may include a plurality of signal drive regions arranged in an array, and each of the signal drive regions may include a drive signal line 5 extending along the second direction Y.

In an exemplary implementation mode, for each pixel structure, as shown in FIG. 4b to FIG. 4d, the drive signal line 5 on the third conductive layer may include a first drive signal line 51 and a second drive signal line 52 extending along the second direction Y. Herein, the first drive signal line 51 is electrically connected with a plurality of first connection electrodes 41, and the second drive signal line 52 is electrically connected with a plurality of second connection electrodes 42.

In an exemplary implementation mode, as shown in FIG. 4a, in a same pixel structure, a first electrode 31 and a second electrode 32 are connected with one auxiliary connection electrode 4, and the first electrode 31 and the second electrode 32 are connected with one drive signal line 5; the drive signal line 5 provides a same drive signal to the first electrode 31 and the second electrode 32, and a same picture is displayed on two display surfaces of the display substrate. Herein, the drive signal line 5 and the auxiliary connection electrode 4 may be disposed sequentially on the first substrate 100 along the first direction X, and located on a side of a third electrode 33 in an opposite direction of the first direction X. The first direction X may be a direction in which the first electrode 31 extends. An arrangement mode of the drive signal line 5 and the auxiliary connection electrode 4 on the first substrate 100 is not limited to that shown in FIG. 4a. For example, the drive signal line 5 may be disposed on a side of the first substrate 100 located in an opposite direction of the first direction X of the third electrode 33, and the auxiliary connection electrode 4 may be disposed on a side of the first substrate 100 located in the first direction X of the third electrode 33, which is not limited here in the present disclosure.

In an exemplary implementation mode, as shown in FIG. 4b to FIG. 4c, in a same pixel structure, a first electrode 31 is electrically connected with a first connection electrode 41 in an auxiliary connection electrode 4; a second electrode 32 is electrically connected with a second connection electrode 42 in the auxiliary connection electrode 4; the first electrode 31 is electrically connected with a first drive signal 51 in a drive signal line 5, and the second electrode 32 is electrically connected with a second drive signal line 52 in the drive signal line 5, so that two display surfaces of the display substrate may be independently displayed, and a same picture or different pictures may be displayed on the two display surfaces. In an exemplary implementation mode, the first drive signal line 51 and the first connection electrode 41 may be disposed sequentially on the first substrate 100 along the first direction X and located on a side of a third electrode 33 in an opposite direction of the first direction X; and the second drive signal line 52 and the second connection electrode 42 may be disposed sequentially on the first substrate 100 along the opposite direction of the first direction X and located on a side of the third electrode 33 in the first direction X. An arrangement mode of the first drive signal line 51, the second drive signal line 52, the first connection electrode 41, and the second connection electrode 42 on the first substrate 100 is not limited to those shown in FIG. 4b to FIG. 4c. For example, the first drive signal line 51, the second drive signal line 52, the first connection electrode 41, and the second connection electrode 42 may be disposed on a side of the first substrate 100 located in the first direction X of the third electrode 33 or located in an opposite direction of the first direction X of the third electrode 33, which is not limited here in the present disclosure.

In structures shown in FIG. 4b to FIG. 4c, in a same pixel structure, the first electrode 31 is driven through the first drive signal line 51, and the second electrode 32 is driven through the second drive signal line 52, so that two display pictures of the display substrate be independently driven, so that pictures displayed on the two display pictures may be the same or different. A plurality of first electrodes 31 are connected through the first connection electrode 41, and resistance values of the plurality of first electrodes 31 may be reduced by connecting the plurality of first electrodes 31 as a whole; the plurality of second electrodes 32 are connected through the second connection electrode 42, and resistance values of the plurality of second electrodes 32 may be reduced by connecting the plurality of second electrodes 32 as a whole. In a structure shown in FIG. 4a, a plurality of first electrodes 31 and a plurality of second electrodes 32 are all connected with a same auxiliary connection electrode 4, and resistance values of the plurality of first electrodes 31 and the plurality of second electrodes 32 may be reduced by connecting a plurality of electrodes as a whole.

In the structures shown in FIG. 4b to FIG. 4c, in a same pixel structure, a region in which a plurality of sub-pixels P1 and P2 are arranged constitutes the display region 1001, and orthographic projections of the first connection electrode 41 and the second connection electrode 42 on the first substrate 100 are not overlapped with an orthographic projection of the display region 1001 on the first substrate 100, thereby preventing light emitted from a corresponding region from interfering with a displayed picture of the display substrate after an electric field is generated by the first connection electrode 41 and the second connection electrode 42 on the first substrate 100 and the third electrode 33 on the second substrate 200, thus resistance values of a plurality of electrodes may be reduced and the display substrate may have a better visual effect.

In structures shown in FIG. 4d and FIG. 4e, in a same pixel structure, an auxiliary connection electrode 4 is located in a region between orthographic projections of two adjacent third electrodes 33 on the first substrate 100, which may prevent light emitted from a region corresponds to an electric field generated by the auxiliary connection electrode 4 and the third electrodes 33, from interfering with a displayed picture of the display substrate, thus resistance values of a plurality of electrodes may be reduced and the display substrate may have a better visual effect.

In an exemplary implementation mode, in the structures shown in FIG. 4a to FIG. 4e, the first electrode 31, the second electrode 32, and the auxiliary connection electrode 4 may be fabricated through a one-time patterning process.

In an exemplary implementation mode, for each pixel structure, a quantity of first electrodes 31 and second electrodes 32 is not limited to those shown in FIG. 3a to FIG. 4e, the present disclosure is not limited here.

In an exemplary implementation mode, the third electrode 33 may serve as a common electrode of the display substrate.

In an exemplary implementation mode, an arrangement mode of the drive signal line 5 is not limited to the structures as shown in FIG. 4a to FIG. 4e, the drive signal line 5, and the first electrode 31 and the second electrode 32 may be disposed in different structural layers of the first substrate 100, and an orthographic projection of the drive signal line 5 on the first substrate 100 may be overlapped or not be overlapped with an orthographic projection of the third electrode 33 on the first substrate 100, which is not limited here in the present disclosure.

In an exemplary implementation mode, for each pixel structure, a fifth light shielding structure arranged in a same manner as the first light shielding structure 111 may be disposed on the first substrate 100, and a sixth light shielding structure arranged in a same manner as the second light shielding structure may be disposed on the second substrate 200; a region in which a plurality of sub-pixels are arranged constitutes a display region, and orthographic projections of the fifth light shielding structure and the sixth light shielding structure on the first substrate 100 are not overlapped with an orthographic projection of the display region on the first substrate 100.

Figure 5A:
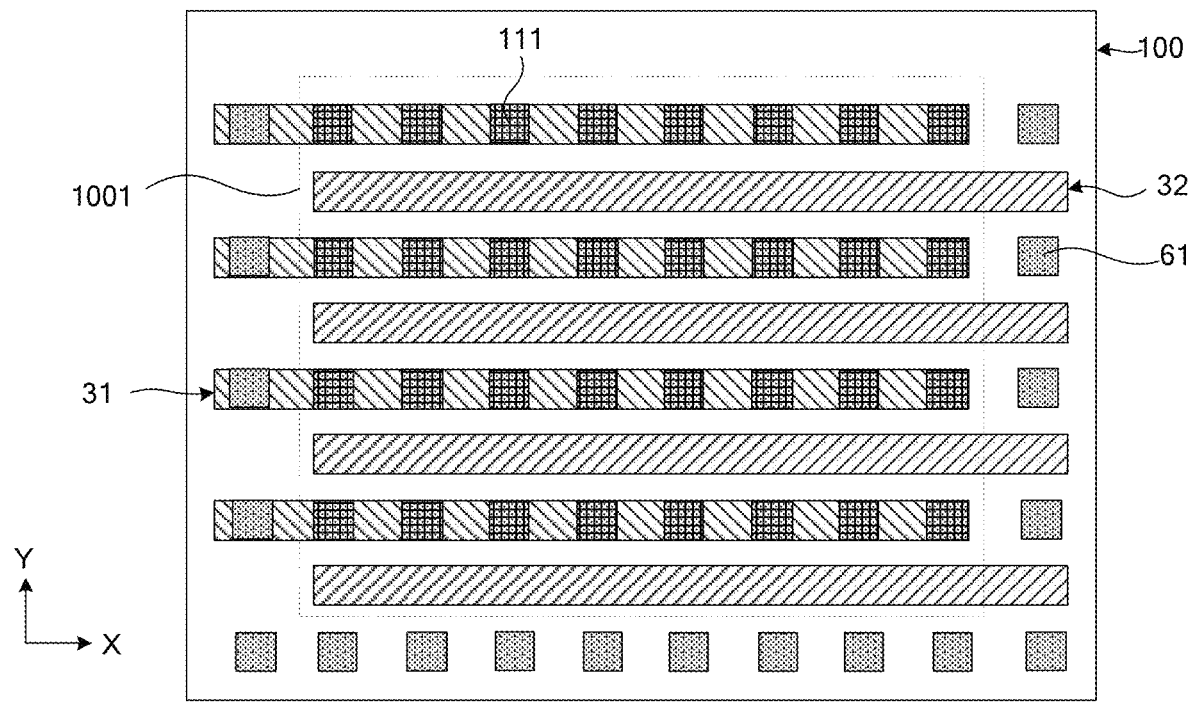
FIG. 5a is a schematic diagram of a planar structure of a first substrate in a display substrate according to an exemplary embodiment.

As shown in FIG. 5a, it is a schematic diagram of a planar structure of a first substrate 100 corresponding to one pixel structure in a display substrate. In a structure shown in FIG. 5a, for a region corresponding to each pixel structure, a fifth light shielding structure 61 arranged in a same manner as the first light shielding structure 111 may be disposed on the first substrate 100, a region in which a plurality of sub-pixels P1 and P2 are arranged constitutes a display region 1001, and an orthographic projection of the fifth light shielding structure 61 on the first substrate 100 is not overlapped with an orthographic projection of the display region 1001 on the first substrate 100.

Figure 5B:
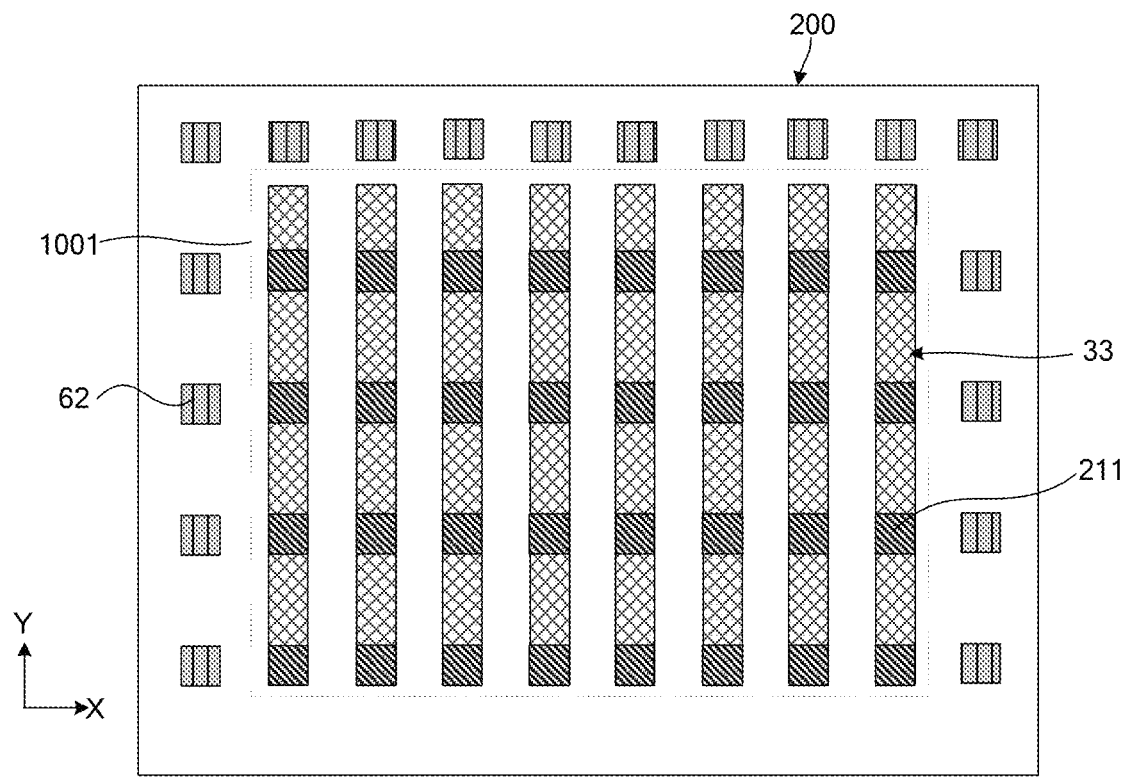
FIG. 5b is a schematic diagram of a planar structure of a second substrate in a display substrate according to an exemplary embodiment.

As shown in FIG. 5b, it is a schematic diagram of a planar structure of a second substrate 200 corresponding to one pixel structure in a display substrate. In a structure shown in FIG. 5b, for a region corresponding to each pixel structure, a sixth light shielding structure 62 arranged in a same manner as the second shielding structure 211 is disposed on the second substrate 200, a region in which a plurality of sub-pixel are arranged constitutes a display region 1001, and an orthographic projection of the sixth light shielding structure 62 on the first substrate 100 is not overlapped with an orthographic projection of the display region 1001 on the first substrate 100.

Figure 5C:
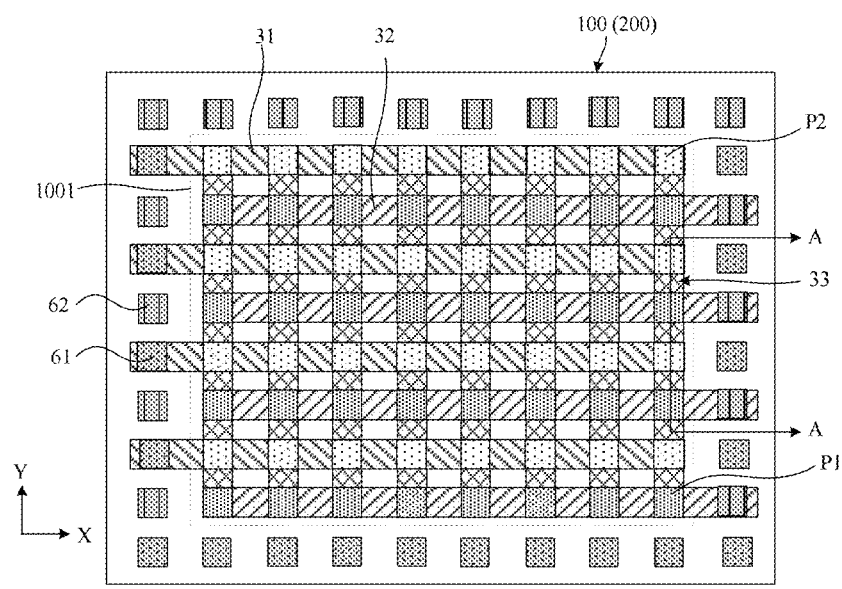
FIG. 5c to FIG. 5d are schematic diagrams of a planar structure of a display substrate according to an exemplary embodiment.
Figure 5D:
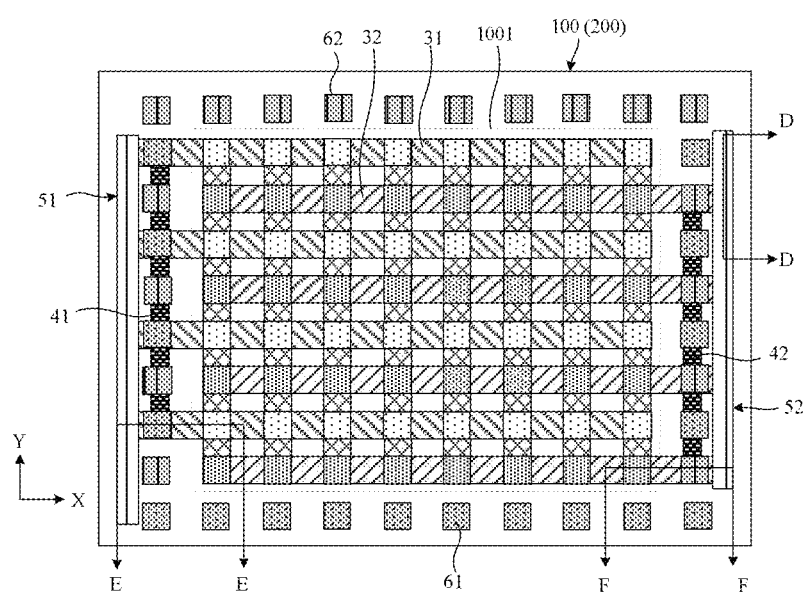

As shown in FIG. 5c, it is a schematic diagram of a planar structure of a region corresponding to one pixel structure in the display substrate after the fifth light shielding structure 61 and the sixth light shielding structure 62 are disposed. FIG. 5d is a schematic diagram of a planar structure based on a structure shown in FIG. 5c, in which a first drive signal line 51, a second drive signal line 52, a first connection electrode 41, and a second connection electrode 42 are disposed on the first substrate 100.

In pixel structures shown in FIG. 5a to FIG. 5d, for each pixel structure, the fifth light shielding structure 61 and the sixth light shielding structure 62 are disposed in a region outside the display region 1001, which may make a screen transmittance of the pixel structure consistent, thus making the display substrate have a better display effect.

In an exemplary implementation mode, as shown in FIG. 2d, it is a cross-sectional view in an A-A direction in FIG. 2c and FIG. 5c. For each pixel structure, an orthographic projection of the second shielding structure 211 disposed on the second substrate 200 on the first substrate 100 covers a second overlapping region, and the second overlapping region forms a first display region S1 that emits light from a side of the first substrate 100 away from the second substrate 200; an orthographic projection of the first light shielding structure 111 disposed on the first substrate 100 on the first substrate 100 covers a first overlapping region, and the first overlapping region forms a second display region S2 that emits light from a side of the second substrate 200 away from the first substrate 100; wherein a transparent region T is formed on the first substrate 100 in a region other than the first display region S1 and the first light shielding structure 111, and a transparent region T is formed on the second substrate 200 in a region other than the second display region S2 and the second light shielding structure 211.

In an exemplary implementation mode, as shown in conjunction with FIG. 2a to FIG. 2f, in each pixel structure, a first sub-pixel P1 defined by the second overlapping region forms a first display region S1 displaying a first picture G1 on a side of the first substrate 100 away from the second substrate 200. A second light shielding structure 211 is disposed on a second light shielding layer of the second substrate 200 at a position corresponding to the first sub-pixel P1. The second light shielding structure 211 is configured such that the first picture G1 can only be emitted from a side of the first substrate 100, but cannot be emitted from a side of the second substrate 200, so that light is transmitted from a region other than the first display region S1 and the first light shielding structure 111 on the first substrate 100 to form a transparent region T.

In an exemplary implementation mode, as shown in conjunction with FIG. 2a to FIG. 2f, for each pixel structure, a second sub-pixel P2 defined by the first overlapping region forms a second display region S2 displaying a second picture G2 on a side of the second substrate 200 away from the first substrate 100. A first light shielding structure 111 is disposed on the first light shielding layer of the first substrate 100 at a position corresponding to the second sub-pixel P2. The first light shielding structure 111 is configured such that the second picture G2 can only be emitted from a side of the second substrate 200, but cannot be emitted from a side of the first substrate 100, so that light is transmitted from a region other than the second display region S2 and the second light shielding structure 211 on the second substrate to form a transparent region T.

In an exemplary implementation mode, in structures shown in FIG. 5c and FIG. 2c to FIG. 2d, for each pixel structure, since there is a second overlapping region between an orthographic projection of a second electrode 32 that is on the first substrate 100 on the first substrate 100, and orthographic projections of a third electrode 33 and a second light shielding structure 211 on the second substrate 200 on the first substrate 100, the second electrode 32 and the third electrode 33 within the second overlapping region form an electric field driving deflection of a liquid crystal layer 300 when the display substrate is working, a liquid crystal polymer is in a scattered state, light passing through the liquid crystal layer is emitted from a side of the first substrate 100 under a shielding action of the second light shielding structure 211, a first picture G1 is displayed in a first display region S1 on a side in an opposite direction of a third direction Z, and a viewer located in the opposite direction of the third direction Z may see the first picture G1 displayed in the first display region S1. Since the second shielding structure 211 shields the first display region S1, a viewer located on a side of the third direction Z cannot see the first picture G1 displayed in the first display region S1. In a region other than the first display region S1 and the first shielding structure 111 disposed on the first substrate 100, light may transmit through the first substrate 100, the liquid crystal layer 300, and the second substrate 200 to form a transparent region T.

In an exemplary implementation mode, in the structures shown in FIG. 5c and FIG. 2c to FIG. 2d, for each pixel structure, since there is a first overlapping region between orthographic projections of the first electrode 31 and the first light shielding structure 111 that are on the first substrate 100 on the first substrate 100, and an orthographic projection of the third electrode 33 on the second substrate 200 on the first substrate 100, the first electrode 31 and the third electrode 33 within the first overlapping region form an electric field driving deflection of a liquid crystal layer 300 when the display substrate is working, a liquid crystal polymer is in a scattering state, light passing through the liquid crystal layer is emitted from a side of the second substrate 200 under a shielding action of the first light shielding structure 111, a second picture G2 is displayed in the second display region S2 on a side of the third direction Z, and a viewer located in the third direction Z may see the second picture G2 displayed in the second display region S2. Since the first shielding structure 111 shields the second display region S2, a viewer located on a side in an opposite direction of the third direction Z cannot see the second picture G2 displayed in the second display region S2. In a region other than the second display region S2 and the second light shielding structure 211 disposed on the second substrate 200, light may transmit through the first substrate 100, the liquid crystal layer 300, and the second substrate 200 to form a transparent region T.

The liquid crystal layer 300 in an exemplary embodiment of the present disclosure may include a Polymer Stabilized Liquid Crystal (PSLC for short), which may be referred to as a liquid crystal gel, and may be formed by a mixture of liquid crystal, polymerizable liquid crystal monomer, and photoinitiator under irradiation of ultraviolet light. When the mixture is irradiated by ultraviolet light, the polymerizable liquid crystal monomer is polymerized, and a long chain direction of a polymer is substantially consistent with a long axis direction of a liquid crystal molecule. When a pixel structure is not working (not energized), the long axis direction of the liquid crystal molecule in the liquid crystal polymer is consistent with an extension direction of a long chain in the liquid crystal polymer, and the polymer stabilized liquid crystal has a high light transmittance, with a transmittance being up to about 90%. When the pixel structure is working (energized), under an action of an electric field formed by the first electrode 31, the second electrode 32, and the third electrode 33 in the pixel structure, a liquid crystal molecule in the liquid crystal polymer is deflected, the liquid crystal polymer is in a scattering state due to an action of a polymer network, and a display response speed is very fast, with the response speed being up to about 1 millisecond to 2 milliseconds, so that light passing through the polymer stabilized liquid crystal is emitted from one side of the first substrate or one side of the second substrate, thus achieving displaying of a picture. Therefore, the display substrate according to an exemplary embodiment of the present disclosure using the polymer stabilized liquid crystal not only makes the display substrate have relatively high transparency, but also effectively improves transparency and a response speed of double-sided transparent display.

In an exemplary implementation mode, a form of a side-incident light may be adopted for display substrate display; when the liquid crystal layer is in a bright state (energized), liquid crystal deflects, light is scattered, part of light of the first light shielding structure 111 and the second light shielding structure 211 is absorbed, in a region corresponding to the first light shielding structure 111 in the display substrate, light of the liquid crystal layer 300 is emitted from a side of the second substrate 200 under a shielding action of the first light shielding structure 111, and in the second display region S2 displaying the second picture G2 on a side in the third direction Z, a viewer located in the third direction Z may see the second picture G2 displayed in the second display region S2, and a viewer located in an opposite direction of the third direction Z cannot see the second picture G2 displayed in the second display region S2; in a region corresponding to the second light shielding structure 211 in the display substrate, light passing through the liquid crystal layer 300 is emitted from a side of the first substrate 100 under a shielding action of the second light shielding structure 211, and in the first display region S1 displaying the first picture G1 on a side in an opposite direction of the third direction Z, a viewer located in an opposite direction of the third direction Z may see the first picture G1 displayed in the first display region S1, and a viewer on a side in the third direction Z cannot see the first picture G1 displayed in the first display region S1. When the liquid crystal layer is in a dark state (not energized), the liquid crystal does not deflect, and light is totally reflected in the liquid crystal layer. Thereby, a light emission direction of a display region of each pixel structure in the display substrate is controlled through the first light shielding structure 111 and the second light shielding structure 211, thereby achieving double-sided display; there is no electric field, which may drive the liquid crystal to deflect, formed in the transparent region T, and light is totally reflected in the transparent region T, so that the display substrate has a relatively high transmittance.

Figure 6A:
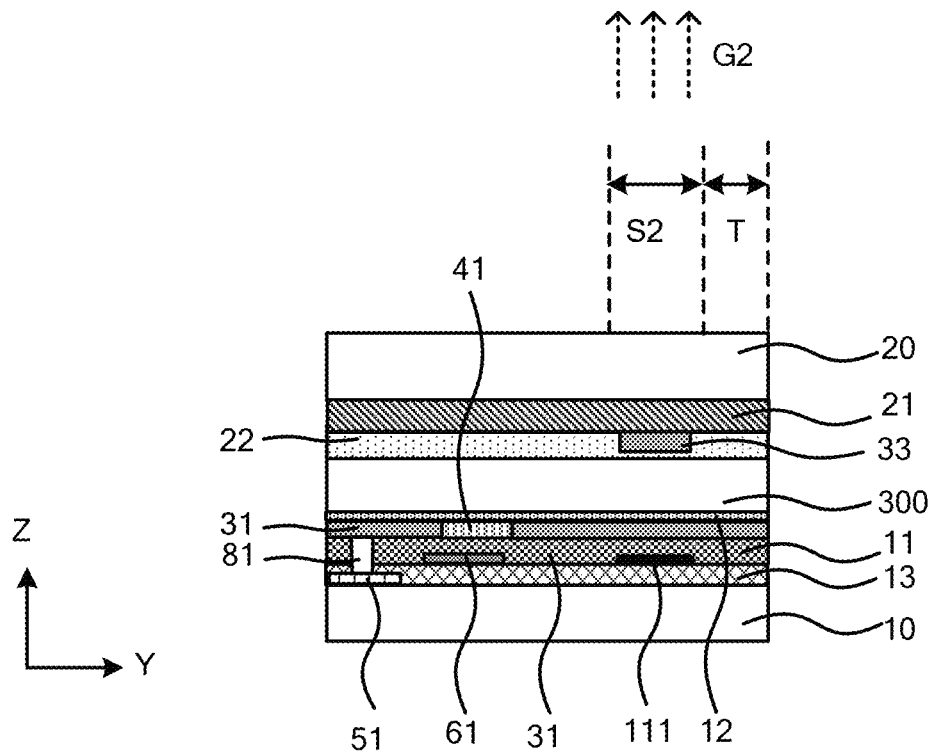
FIGS. 6a to 6c are cross-sectional views of a display substrate according to an exemplary embodiment.

In an exemplary implementation mode, as shown in FIG. 6a, it is a cross-sectional view in an E-E direction in FIG. 5d; the first connection electrode 41 on the first substrate 100 and the first electrode 31 may be formed through a one-time patterning process, and in each pixel structure, the first drive signal line 51 is electrically connected with each first electrode 31 through a first via 81.

Figure 6B:
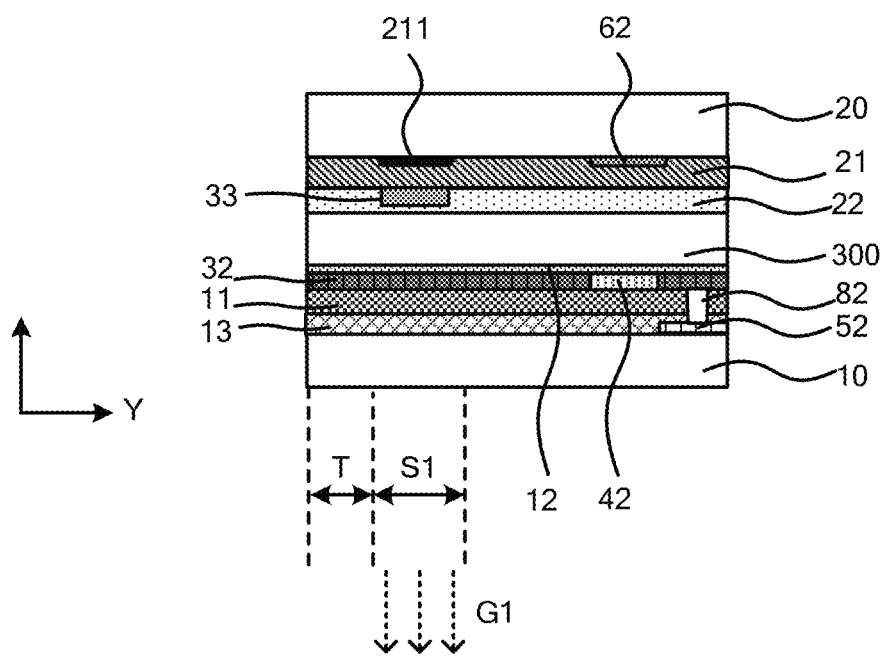

In an exemplary implementation mode, as shown in FIG. 6b, it is a cross-sectional view in an F-F direction in FIG. 5d; the second connection electrode 42 on the first substrate 100 and the second electrode 32 may be formed through a one-time patterning process, and in each pixel structure, the second drive signal line 52 is connected with each second electrode 32 through a second via 82.

In an exemplary implementation mode, as shown in FIG. 6a to FIG. 6b, the first light shielding structure 111 on the first substrate 100 and the fifth light shielding structure 61 may be formed through a one-time patterning process; and the second light shielding structure 211 on the second substrate 200 and the sixth light shielding structure 62 may be formed through a one-time patterning process.

Figure 6C:
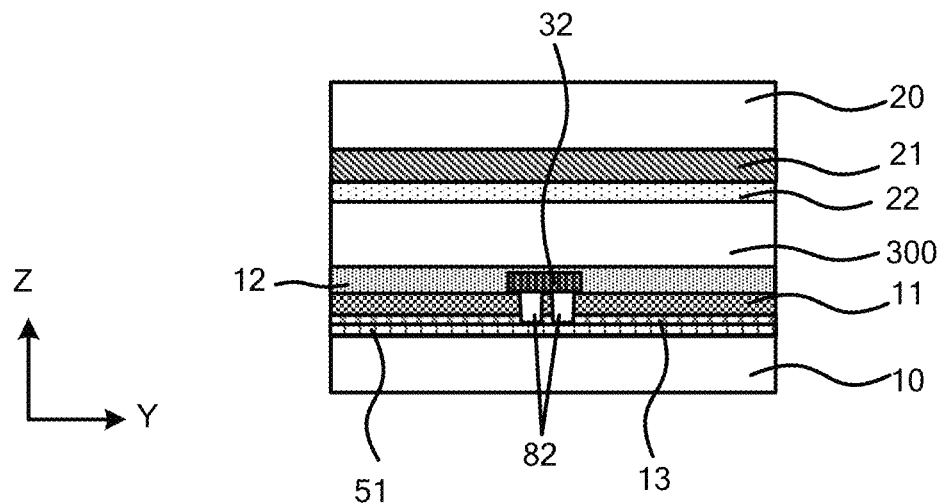

In an exemplary implementation mode, as shown in FIG. 6c, it is a cross-sectional view in a D-D direction in FIG. 5d; in a structure in which the first substrate 100 is provided with the first drive signal line 51 and the second drive signal line 52, as shown in FIG. 6a to FIG. 6c, for each pixel structure, the first electrode 31 disposed on the first substrate 100 is electrically connected with the first drive signal line 51 through the first via 81, and each second electrode 32 is electrically connected with the second drive signal line 52 through at least one second via 82.

In an exemplary implementation mode, as shown in FIG. 2d to FIG. 2f and FIG. 6a to FIG. 6c, the first substrate 100 may be provided with a first planarization layer 11, an insulation layer 13, and a first alignment layer 12, wherein the first planarization layer 11 is located between a first conductive layer and a first light shielding layer, the insulation layer 13 is located between the first light shielding layer and a third conductive layer, and the first alignment layer 12 is located on a side of the first conductive layer close to the second substrate 200.

For each pixel structure, the first planarization layer 11 and the insulation layer 13 are provided with a first via 81 exposing the first drive signal line 51 and a second via 82 exposing the second drive signal line 52.

For each pixel structure, a plurality of first electrodes 31 are connected with the first drive signal line 51 through the first via 81, and a plurality of second electrodes 32 are connected with the second drive signal line 52 through the second via 82.

In an exemplary implementation mode, there is no overlapping region between orthographic projections of the first via 81 and the second via 82 on the first substrate 100 and an orthographic projection of the first light shielding structure 111 on the first substrate 100, which may avoid an influence of the first light shielding structure 111 on etching of a region where the first via 81 and the second via 82 are located in a via formation process.

In an exemplary implementation mode, in a structure in which the first substrate is provided with the fifth light shielding structure 61, there is no overlapping region between orthographic projections of the first via 81 and the second via 82 on the first substrate 100 and an orthographic projection of the fifth light shielding structure 61 on the first substrate 100, which may avoid an influence of the fifth light shielding structure 61 on etching of a region where the first via 81 and the second via 82 are located in a via formation process.

In an exemplary implementation mode, lengths of the first via 81 and the second via 82 along the first direction X are 5 microns to 20 microns; lengths of the first via 81 and the second via 82 along the second direction Y are 5 microns to 20 microns.

A quantity of first vias 81 is plural, and a quantity of second vias 82 is plural.

For each pixel structure, each of the first electrodes 31 is electrically connected with the first drive signal line 51 through at least one first via 81; and each of the second electrodes 32 is electrically connected with the second drive signal line 52 through at least one second via 82.

In an exemplary implementation mode, for each pixel structure, each of the first electrodes 31 is electrically connected with the first drive signal line 51 through 6 to 15 first vias 81; and each of the second electrodes 32 is electrically connected with the second drive signal line 52 through 6 to 15 second vias 82.

In an exemplary implementation mode, for each pixel structure, each of the first electrodes 31 is electrically connected with the first drive signal line 51 through a set of vias 81, and each of the second electrodes 32 is electrically connected with the second drive signal line 52 through a set of second vias 82, which may enable that the display substrate is charged quickly and a voltage be stable. In an exemplary implementation mode, a quantity of each set of vias is 6 to 15, and the quantity of each set of vias may be set to another quantity, which is not limited here in the present disclosure. For example, each of the first electrodes 31 is electrically connected with the first drive signal line 51 through eight first vias 81; and each of the second electrodes 32 is electrically connected with the second drive signal line 52 through 8 second vias 82.

In an exemplary implementation mode, shapes of the first vias 81 and the second vias 82 are square holes, i.e., an orthographic projection on the first substrate 100 is a square, and a side length of the square is 10 microns to 20 microns. The shapes of the vias 81 and the vias 82 may be square holes or round holes, which is not limited here in the present disclosure. Sizes of the vias 81 and 82 may be set to other sizes, which is not limited here in the present disclosure.

In an exemplary implementation mode, as shown in FIG. 3a to FIG. 4e, for each pixel structure, distances between adjacent first electrodes 31 are equal.

In an exemplary implementation mode, as shown in FIG. 3a to FIG. 4e, for each pixel structure, distances between adjacent second electrodes 32 are equal.

In an exemplary implementation mode, as shown in FIG. 3a to FIG. 4e, for each pixel structure, distances between adjacent third electrodes 33 are equal.

In an exemplary implementation mode, as shown in FIG. 3a to FIG. 4e, for each pixel structure, distances between adjacent first electrodes 31 are equal, distances between adjacent second electrodes 32 are equal, and distances between adjacent third electrodes 33 are equal.

In an exemplary implementation mode, as shown in FIG. 3a and FIG. 4a, for each pixel structure, a second electrode 32 is located between two adjacent first electrodes 31; and a first electrode 31 is located between two adjacent second electrodes 32.

In an exemplary implementation mode, as shown in FIG. 2d to FIG. 2f and FIG. 6a to FIG. 6c, the second substrate 200 is further provided with a second planarization layer 21 and a second alignment layer 22, wherein the second planarization layer 21 is located between a second light shielding layer and a second conductive layer, and the second alignment layer 22 is located on a side of the second conductive layer close to the first substrate 100.

In an exemplary implementation mode, as shown in FIG. 2d to FIG. 2f and FIG. 6a to FIG. 6b, the first substrate 100 includes a first base substrate 10, and the second substrate 200 includes a second base substrate 20; and the insulation layer 13 on the first substrate 100 is disposed on the first base substrate 10, and a second light shielding layer on the second substrate 200 is disposed on the second base substrate 20.

In an exemplary implementation mode, the first base substrate 10 and the second base substrate 20 may include a transparent structure.

In an exemplary implementation mode, the first base substrate 10 and the second base substrate 20 may be of a transparent structure.

Figure 7:
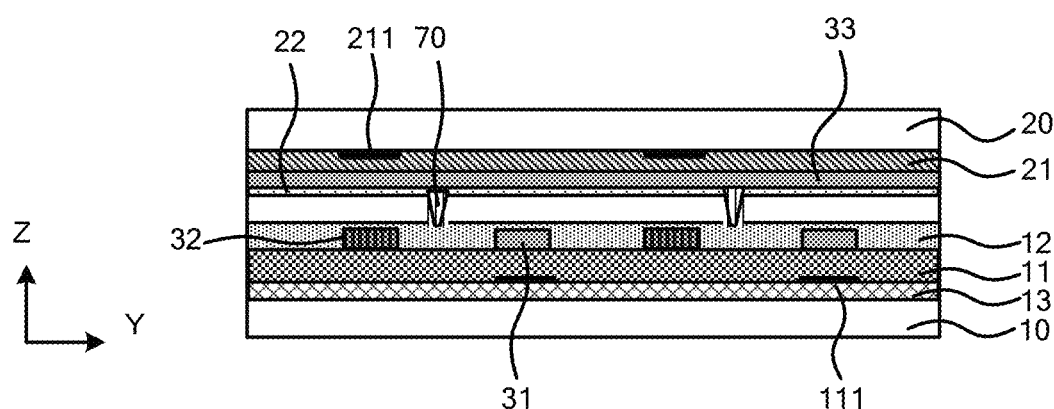
FIG. 7 is a cross-sectional view of a display substrate according to an exemplary embodiment.

In an exemplary implementation mode, as shown in FIG. 7, the display substrate further includes a post spacer 70 disposed between the first substrate 100 and the second substrate 200, wherein the post spacer is configured to support the first substrate 100 and the second substrate 100. In an exemplary implementation mode, the first substrate 100 and the second substrate 200 are supported through the post spacer 70 so that a thickness of a liquid crystal cell obtained after the first substrate 100 and the second substrate 200 are cell aligned may be kept consistent. In an exemplary implementation mode, the post spacers 70 may be disposed in a middle region or a peripheral region of the display substrate, or post spacers 70 may be disposed in the display substrate in a uniformly distributed manner, which is not limited here in the present disclosure.

In an exemplary implementation mode, the post spacers 70 are disposed in such a manner that light emission and light transmission of a pixel structure are not affected as much as possible.

In an exemplary implementation mode, a shape of the post spacer 70 may be a cylindrical structure, a square-columnar structure, or another columnar structure. When a shape of the post spacer is cylindrical, an orthographic projection of the post spacer 70 on the first substrate 100 is a circular region with a diameter of 5 microns to 15 microns. For example, the orthographic projection of the post spacer 70 on the first substrate 100 is a circular region with a diameter of 9 microns.

In an exemplary implementation mode, the post spacer 70 may be of a transparent structure.

In an exemplary implementation mode, a fabrication material of the post spacer 70 may include photoresist.

In an exemplary implementation mode, as shown in FIG. 2a to FIG. 2c, shapes of the first electrodes 31 and the second electrodes 32 may include strip shapes, a shape of the third electrode 33 may include a strip shape, and lengths of the first electrode 31 and the second electrode 32 along the second direction Y may be 80 microns to 100 microns; a length of the third electrode 33 along the first direction X may be 80 microns to 100 microns.

Lengths of the first light shielding structure 111 and the second light shielding structure 211 along the first direction X are 90 microns to 120 microns, and lengths of the first light shielding structure 111 and the second light shielding structure 211 along the second direction Y are 90 microns to 120 microns.

In an exemplary implementation mode, for each pixel structure, a length of the first electrode 31 along the second direction Y is smaller than a length of the first light shielding structure 111 along the second direction Y by 5 microns to 30 microns, and a length of the third electrode 3 along the first direction X is smaller than a length of the first light shielding structure 111 along the first direction X by 5 microns to 30 microns.

A length of the second electrode 32 along the second direction Y is smaller than a length of the second light shielding structure 211 along the second direction Y by 5 microns to 30 microns, and the length of the third electrode 33 along the first direction X is smaller than a length of the second light shielding structure 211 along the first direction X by 5 microns to 30 microns.

In an exemplary implementation mode, for each pixel structure, a length of the first electrode 31 along the second direction Y is smaller than a length of the first light shielding structure 111 along the second direction Y by 10 microns to 20 microns, and a length of the third electrode 33 along the first direction X is smaller than a length of the first light shielding structure 111 along the first direction X by 10 microns to 20 microns.

A length of the second electrode 32 along the second direction Y is smaller than a length of the second light shielding structure 211 along the second direction Y by 10 microns to 20 microns, and the length of the third electrode 33 along the first direction X is smaller than a length of the second light shielding structure 211 along the first direction X by 10 microns to 20 microns.

In an exemplary implementation mode, a strip structure is adopted for the first electrode 31, the second electrode 32, and the third electrode 33, so that an area of an electrode may be increased, resistance may be reduced, and a charging speed may be improved, thereby improving a display effect. A design in which light is emitted from the first overlapping region and the second overlapping region formed using the strip structure is adopted for the first electrode 31, the second electrode 32, and the third electrode 33, which may facilitate arrangement of traces.

In an exemplary implementation mode, a size of one pixel structure may be set by increasing or decreasing a quantity of first sub-pixels P1 and second sub-pixels P2; or a size of one pixel may be set by increasing or decreasing a quantity of first electrodes 31, second electrodes 32, and third electrodes 33.

In an exemplary implementation mode, in a structure in which lengths of the first light shielding structure 111 and the second light shielding structure 211 along the first direction X and along the second direction Y are both 100 microns to 110 microns, and short side widths of strip-shaped first electrodes 31 and second electrodes 41 are both 90 microns, an overall size of one pixel structure is 1 cm*1 cm, a quantity of first sub-pixels P1 is 961 (31*31), a quantity of second sub-pixels P2 is 961 (31*31), and a total number of double-sided light emitting sub-pixels is 1922.

In an exemplary implementation mode, the liquid crystal layer 300 is a polymer stabilized liquid crystal layer.

In an exemplary implementation mode, the first electrode 31, the second electrode 32, and the third electrode 33 are transparent electrodes.

In an exemplary implementation mode, fabrication materials of the first electrode 31, the second electrode 32, and the third electrode 33 may include Indium Tin Oxide (ITO), Indium Zinc Oxide (IZO), or Indium Gallium Zinc Oxide (IGZO).

In an exemplary implementation mode, for each pixel structure, a sum of areas of all the first light shielding structures 111 and all the second light shielding structures 211 is 15% to 35% of a total area of one pixel structure.

In an exemplary implementation mode, for each pixel structure, a sum of areas of all the first light shielding structures 111 and all the second light shielding structures 211 is 20% of a total area of one pixel structure.

For each pixel structure, in a structure in which a total area of all the first light shielding structures 111 and all the second light shielding structures 211 is 20% of an area of one pixel structure, a transmittance of the display substrate is greater than 60%.

In an exemplary implementation mode, for each pixel structure, in a structure in which a total area of all the first light shielding structures 111 and all the second light shielding structures 211 is 20% of an area of one pixel structure, a transmittance of 85% to 95% of other film layers and liquid crystal layer is superimposed, a transmittance of the display substrate is 68% to 76%, and the transmittance is higher than 60%. For example, in a structure in which a total area of all the first light shielding structures 111 and all the second light shielding structures 211 in each pixel structure is 20% of an area of one pixel structure, a transmittance of 90% of other film layers and the liquid crystal layer is superimposed, and a transmittance of the display substrate is 70%.

Figure 8:
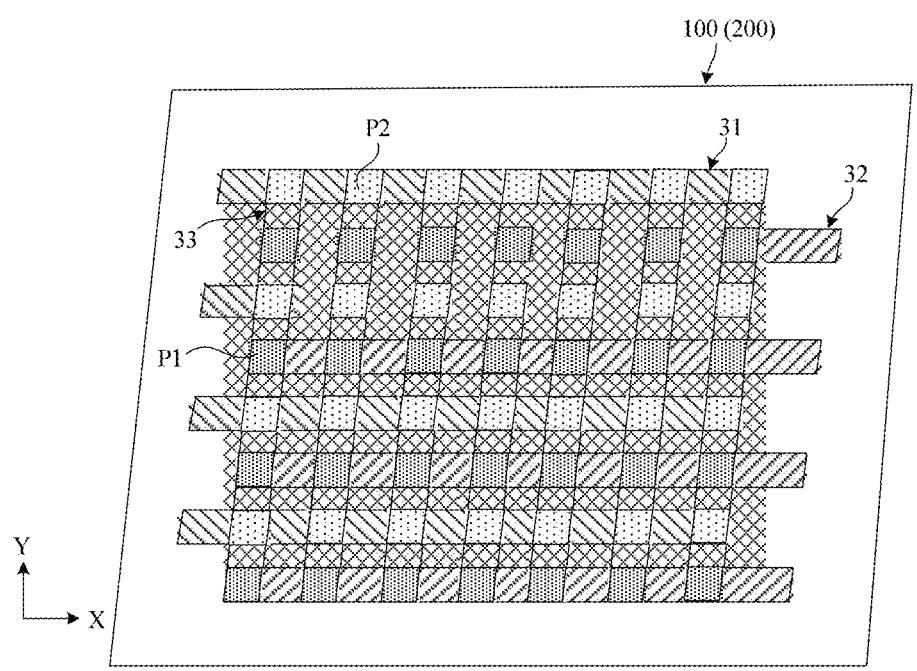
FIG. 8 is a schematic diagram of a planar structure of a display substrate according to an exemplary embodiment.

In an exemplary implementation mode, for each pixel structure, an orthographic projection of the first electrode 31 on the first substrate 100 and an orthographic projection of the third electrode 33 on the first substrate 100 are not limited to a mutually perpendicular form, and an orthographic projection of the second electrode 32 on the first substrate 100 and the orthographic projection of the third electrode 33 on the first substrate 100 are not limited to a mutually perpendicular form; as shown in FIG. 8, in a region corresponding to each pixel structure, there is an overlapping region between the orthographic projection of the first electrode 31 on the first substrate 100 and the orthographic projection of the third electrode 33 on the first substrate 100, but the orthographic projections are not perpendicular to each other; and there is an overlapping region between the orthographic projection of the second electrode 32 on the first substrate 100 and the orthographic projection of the third electrode 33 on the first substrate 100, but the orthographic projections are not perpendicular to each other, which is not limited here in the present disclosure.

In an exemplary implementation mode, shapes of the first light shielding structure 111 and the second light shielding structure 211 are not limited to rectangles as shown in FIG. 3a to FIG. 5d, and may be set as parallelograms consistent with shapes (shapes of the first overlapping region and the second overlapping region) of sub-pixels P1 and P2 shown in FIG. 8. In an exemplary implementation mode, a shape of the first light shielding structure 111 may be set to be consistent with a shape of the first overlapping region, and a shape of the second light shielding structure 211 may be set to be consistent with a shape of the second overlapping region; or the shape of the first light shielding structure 111 may not be consistent with the shape of the first overlapping region as long as the first light shielding structure 111 may cover the first overlapping region; and the shape of the second light shielding structure 211 may not be consistent with the shape of the second overlapping region as long as the second light shielding structure 211 may cover the first overlapping region, which is not limited here in the present disclosure.

Figure 9:
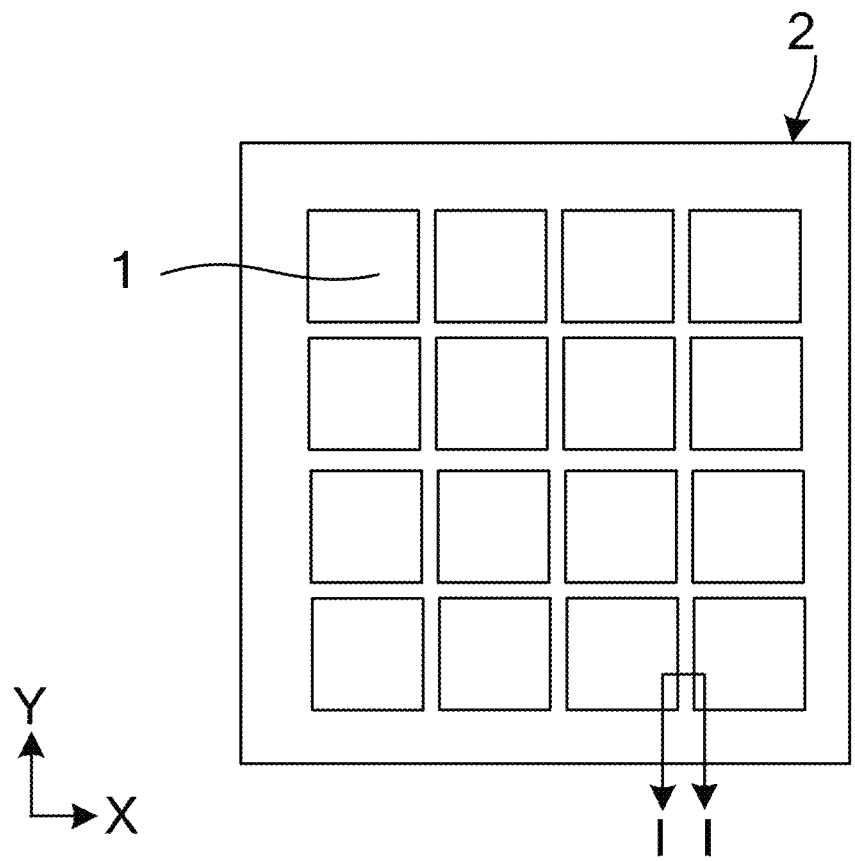
FIG. 9 is a schematic diagram of a planar structure of a display substrate according to an exemplary embodiment.

As shown in FIG. 9, a display substrate 2 includes 16 (4*4) pixel structures 1 described in the above embodiment. FIG. 2a to FIG. 2c, FIG. 3a to FIG. 5d, and FIG. 8 are schematic diagrams of a planar structure of a region corresponding to one pixel structure in the display substrate.

In the exemplary implementation mode, a quantity of pixel structures disposed in the display substrate 2 is not limited to 16, and a quantity of pixel structures 1 may be set according to a size of the display substrate, which is not limited here in the present disclosure.

Figure 10:
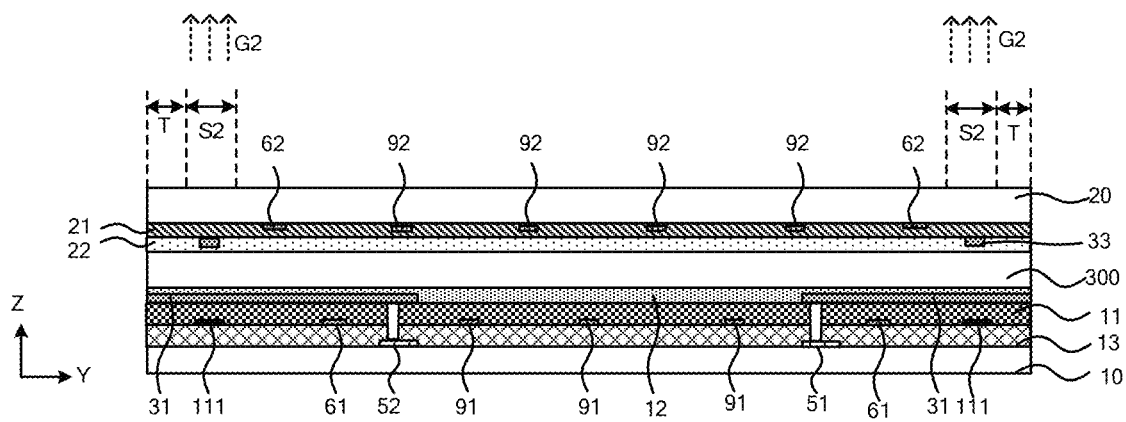
FIG. 10 is a cross-sectional view of a display substrate according to an exemplary embodiment.

In an exemplary implementation mode, as shown in FIG. 10, it is a cross-sectional view in an I-I direction in FIG. 9; the first light shielding layer further includes a third light shielding region, and the second light shielding layer further includes a fourth light shielding region, wherein the third light shielding region and the fourth light shielding region are located between adjacent pixel structures 1, the third light shielding region includes a plurality of third light shielding structures 91 arranged in an array, and the fourth light shielding region includes a plurality of fourth light shielding structures 92 arranged in an array.

Orthographic projections of the plurality of third light shielding structures 91 on the first substrate are not overlapped with an orthographic projection of a pixel structure 1 on the first substrate 100, and orthographic projections of the plurality of fourth light shielding structures 92 on the first substrate are not overlapped with the orthographic projection of the pixel structure 1 on the first substrate 100.

In an exemplary implementation mode, as shown in FIG. 10, the third light shielding structure 91 may be arranged in a same manner as the first light shielding structure 111; and the fourth light shielding structure 92 may be arranged in a same manner as the second light shielding structure 211.

The third light shielding structure 91 and the fourth light shielding structure 92 are disposed, which may make a screen transmittance of the display substrate consistent, so that the display substrate has a better display effect.

In an exemplary implementation mode, the third light shielding structure 91 and the fourth light shielding structure 92 may be formed with the first light shielding structure 111 and the second light shielding structure 211 through a one-time patterning process.

In an exemplary implementation mode, fabrication materials of the first light shielding structure 111, the second light shielding structure 211, the third light shielding structure 91, and the fourth light shielding structure 92 include optical resin, black resin, or chromium. Herein, the chromium may be Chromium (Cr) element or Chromium Oxide (CrOx).

In an exemplary implementation mode, the first light shielding structure 111, the second light shielding structure 211, the third light shielding structure 91, and the fourth light shielding structure 92 may be a Black Matrix (BM for short) made of one or more materials including optical resin, black resin, and chromium.

In an exemplary implementation mode, the "patterning process" mentioned in the embodiment of the present disclosure may include processes such as film layer deposition, photoresist coating, mask exposure, development, etching, and photoresist stripping.

In an exemplary implementation mode, the display substrate may include a light source apparatus configured to achieve color display in a mode of Field Sequential Color (FSC). In an exemplary implementation mode, the light source apparatus may periodically and sequentially emit light of a first color, light of a second color, and light of a third color according to timing sequence, such that one pixel structure sequentially displays a sub-picture of the first color, a sub-picture of the second color, and a sub-picture of the third color according to the timing sequence, and a full-color picture is presented on a retina in a time color mixing mode by using persistence of human eye vision.

In an exemplary implementation mode, the light of the first color may be red light, the light of the second color may be green light, and the light of the third color may be blue light.

In an exemplary implementation mode, the light source apparatus may include a first light source configured to emit the light of the first color, a second light source configured to emit the light of the second color, and a third light source configured to emit the light of the third color. In an exemplary implementation mode, the first light source, the second light source, and the third light source may be three independent light emitting devices, or may be an integrated as an all-in-one light emitting device, which achieves periodic sequential emission by using timing sequence control.

In an exemplary implementation mode, one-frame display period of the display substrate may be divided into three light emitting periods, wherein a light source of one color emits light in each light emitting period, light intensities of the three light sources are the same, and a light intensity of each light source is constant. In a first light emitting period, the first light source emits red light, and the red light is incident on each pixel structure of the display substrate, and a display gray scale of the pixel structure in this period is adjusted through a data signal of a drive signal line of the display substrate. In a second light emitting period, the second light source emits green light, and the green light is incident on each pixel structure of the display substrate, and a display gray scale of the pixel structure in this period is adjusted through a data signal of a drive signal line of the display substrate. In a third light emitting period, the third light source emits blue light, and the blue light is incident on each pixel structure of the display substrate, and a display gray scale of the pixel structure in this period is adjusted through a data signal of a drive signal line of the display panel. In this way, for each pixel structure of the display substrate displays red at an adjusted first gray scale in the first light emitting period, displays green at an adjusted second gray scale in the second light emitting period, and displays blue at an adjusted third gray scale in the third light emitting period. In one-frame display period, a color presented by each pixel structure is composed of red, green, and blue with different gray scales. In a related technology, a display substrate forms a color through a red sub-pixel, a green sub-pixel, and a blue sub-pixel, thus three pixel structures are needed. In an exemplary embodiment of the present disclosure, colors of pixels are formed in a time division manner in which red, green, and blue are respectively displayed in one-frame display period, and only one pixel structure is needed to present a required color.

In an exemplary implementation mode, a Light Emitting Diode (LED) may be used for the first light source, the second light source, and the third light source. The LED has advantages such as a high contrast ratio, high brightness, a high yield, special-shaped cutting characteristics, and better color rendering, which is conducive to lightness and thinness of a display apparatus, which is not limited in the present disclosure.

In an exemplary implementation mode, the light source apparatus may be disposed on a side of the first substrate 100 away from the second substrate 200, or the light source apparatus may be disposed on a side of the second substrate 200 away from the first substrate 100, or the light source apparatus may be disposed on a side surface of the first substrate 100, or the light source apparatus may be disposed on a side surface of the second substrate 200.

In an exemplary implementation mode, the light source apparatus may be disposed on a side surface of the first substrate 100. A light source of the light source apparatus is configured to emit light to the first base substrate 10, and the first base substrate 10 as a light guide structure conducts light through total reflection, and emits light in a first display region S1 and a second display region S2, thereby achieving display of pictures of different gray scales.

In an exemplary implementation mode, the light source apparatus may be disposed on a side surface of the second substrate 200. The light source of the light source apparatus is configured to emit light to the second base substrate 20, and the second base substrate 20 as a light guide structure conducts light through total reflection, and emits light in the first display region S1 and the second display region S2, thereby achieving display of pictures of different gray scales.

In an exemplary implementation mode, the light source apparatus may be disposed on a side surface of a polymer stabilized liquid crystal layer 300. The light source of the light source apparatus is configured to emit light to the polymer stabilized liquid crystal layer 300. By setting a refractive index of the polymer stabilized liquid crystal layer 300 to be greater than refractive indexes of alignment layers on both sides thereof, the polymer stabilized liquid crystal layer 300 as a light guide structure conducts light, and emits light in the first display region S1 and the second display region S2, thereby achieving display of pictures of different gray scales.

In an exemplary implementation mode, the light source apparatus may include a light source and a light guide plate, wherein the light guide plate may be disposed on a side of the first substrate 100 away from the second substrate 200 and the light guide plate is connected with the first substrate 100 through an optical adhesive layer, and the light source is disposed on a side surface of the light guide plate and is configured to emit light to the light guide plate; and the light guide plate as a light guide structure conducts light through total reflection, and emits light in the first display region S1 and the second display region S2, thereby achieving display of pictures of different gray scales.

In an exemplary implementation mode, the light source apparatus may include a light source and a light guide plate, wherein the light guide plate may be disposed on a side of the second substrate 200 away from the first substrate 100 and the light guide plate is connected with the second substrate 200 through an optical adhesive layer, and the light source is disposed on a side surface of the light guide plate 500 and is configured to emit light to the light guide plate; the light guide plate as a light guide structure conducts light through total reflection, and emits light in the first display region S1 and the second display region S2, thereby achieving display of pictures of different gray scales.

An embodiment of the present disclosure also provides a display apparatus which includes the display substrate described in any of the aforementioned embodiments.

In an exemplary implementation mode, the display apparatus may be any product or component with a display function such as a mobile phone, a tablet computer, a television, a display, a laptop computer, a digital photo frame, and a navigator.

Figure 11:
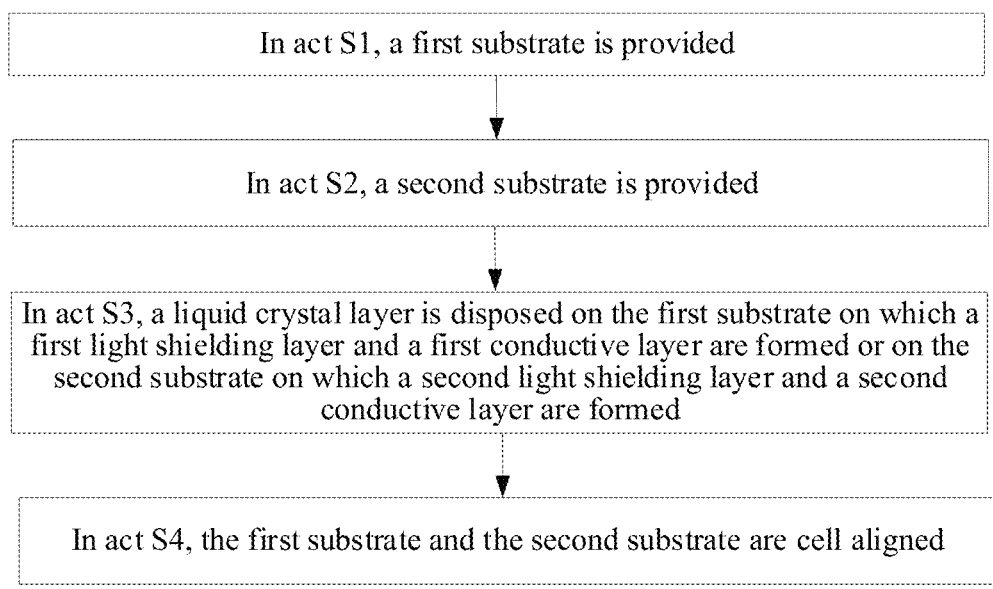
FIG. 11 is a flowchart of a preparation method of a display substrate according to an embodiment of the present disclosure.

An embodiment of the present disclosure also provides a preparation method of a display substrate, as shown in FIG. 11, which may include following acts.

In act S1, a first substrate is provided.

A first light shielding layer and a first conductive layer are formed sequentially on the first substrate; the first conductive layer includes a plurality of first electrode regions arranged in an array, and each of the first electrode regions includes at least one first electrode arranged along a second direction and at least one second electrode arranged along the second direction, wherein the first electrode and the second electrode extend along a first direction, and the at least one first electrode and the at least one second electrode are alternately disposed; the first light shielding layer includes a plurality of first light shielding regions arranged in an array, and each of the first light shielding regions includes a plurality of first light shielding structures arranged in an array.

In act S2, a second substrate is provided.

A second light shielding layer and a second conductive layer are formed sequentially on the second substrate; the second conductive layer includes a plurality of second electrode regions arranged in an array, and each of the second electrode regions includes at least one third electrode arranged along the first direction and the third electrode extends along the second direction, wherein the first direction intersects with the second direction; the second light shielding layer includes a plurality of second light shielding regions arranged in an array, and each of the second light shielding regions includes a plurality of second light shielding structures arranged in an array.

In act S3, a liquid crystal layer is disposed on the first substrate on which the first light shielding layer and the first conductive layer are formed or on the second substrate on which the second light shielding layer and the second conductive layer are formed.

In act S4, the first substrate and the second substrate are cell aligned to form the display substrate; the display substrate includes a plurality of pixel structures arranged in an array, and each of the pixel structures includes a first electrode region, a second electrode region, a first light shielding region, and a second light shielding region; for each pixel structure, an orthographic projection of a first light shielding structure on the first substrate is at least partially overlapped with a first overlapping region, and an orthographic projection of a second light shielding structure on the first substrate is at least partially overlapped with a second overlapping region; and the first overlapping region is an overlapping region between orthographic projections of a plurality of first electrodes and a plurality of third electrodes on the first substrate, and the second overlapping region is an overlapping region between orthographic projections of a plurality of second electrodes and a plurality of third electrodes on the first substrate.

In an exemplary implementation mode, the act of providing the first substrate further includes forming a third conductive layer on the first substrate. The third conductive layer includes a first drive signal line and a second drive signal line extending along the second direction, wherein the first drive signal line is electrically connected with a plurality of first electrodes, and the second drive signal line is electrically connected with a plurality of second electrodes.

In an exemplary implementation mode, the act of providing the first substrate further includes forming an insulation layer on the third conductive layer, forming a first planarization layer on the first light shielding layer, and forming a first alignment layer on the first conductive layer. The first planarization layer and the insulation layer are provided with a first via exposing the first drive signal line and a second via exposing the second drive signal line; a plurality of first electrodes are connected with the first drive signal line through the first via, and a plurality of second electrodes are connected with the second drive signal line through the second via; and there is no overlapping region between orthographic projections of the first via and the second via on the first substrate and an orthographic projection of the first light shielding structure on the first substrate.

In an exemplary implementation mode, the act of providing the second substrate further includes forming a first planarization layer on the second light shielding layer, and forming a second alignment layer on the second conductive layer.

In an exemplary implementation mode, the method further includes disposing a plurality of post spacers on the first conductive layer or on the second conductive layer. After the first substrate and the second substrate are cell aligned, the plurality of post spacers are disposed to support the first substrate and the second substrate, which makes a thickness of a liquid crystal cell formed after cell alignment keep consistent.

Embodiments of the present disclose provide a display substrate, a preparation method thereof, and a display apparatus; a plurality of first light shielding structures are disposed on the first substrate, and a plurality of second light shielding structures are disposed on the second substrate; in a region corresponding to each pixel structure, orthographic projections of a plurality of first electrodes on the first substrate and a plurality of third electrodes on the second substrate are at least partially overlapped with an orthographic projection of the first light shielding structure on the first substrate, orthographic projections of a plurality of second electrodes on the first substrate and a plurality of third electrodes on the second substrate are at least partially overlapped with an orthographic projection of the second light shielding structure on the first substrate, and the first electrodes and the second electrodes are alternately disposed, so that the display substrate may have a better visual effect of double-sided display.

The drawings of the embodiments of the present disclosure only involve structures involved in the embodiments of the present disclosure, and other structures may be referred to usual designs.

The embodiments of the present disclosure, i.e., features in the embodiments, may be combined with each other to obtain new embodiments if there is no conflict.

Although implementation modes disclosed in the present disclosure are as above, the described contents are only implementation modes used for convenience of understanding the present disclosure and are not intended to limit the present disclosure. Any skilled person in the art to which the present disclosure pertains may make any modification and alteration in forms and details of implementation without departing from the spirit and scope of the present disclosure. However, patent protection scope of the present disclosure should be subject to the scope defined in the appended claims.

The invention claimed is:

1. A display substrate, comprising a first substrate and a second substrate disposed oppositely, and a liquid crystal layer disposed between the first substrate and the second substrate; a first light shielding layer and a first conductive layer are disposed on a side of the first substrate close to the second substrate, wherein the first conductive layer is located on a side of the first light shielding layer close to the second substrate; a second light shielding layer and a second conductive layer are disposed on a side of the second substrate close to the first substrate, wherein the second conductive layer is located on a side of the second light shielding layer close to the first substrate;

the first conductive layer comprises a plurality of first electrode regions arranged in an array, and each of the first electrode regions comprises at least one first electrode arranged along a second direction and at least one second electrode arranged along the second direction, wherein the first electrode and the second electrode extend along a first direction, and at least one first electrode and at least one second electrode are alternately disposed;

the second conductive layer comprises a plurality of second electrode regions arranged in an array, each of the second electrode regions comprises at least one third electrode arranged along the first direction, and the third electrode extends along the second direction, wherein the first direction intersects with the second direction;

the first light shielding layer comprises a plurality of first light shielding regions arranged in an array, and each of the first light shielding regions comprises a plurality of first light shielding structures arranged in an array;

the second light shielding layer comprises a plurality of second light shielding regions arranged in an array, and each of the second light shielding regions comprises a plurality of second light shielding structures arranged in an array;

the display substrate comprises a plurality of pixel structures arranged in an array, and each of the pixel structures comprises the first electrode region, the second electrode region, the first light shielding region, and the second light shielding region;

for each pixel structure, an orthographic projection of the first light shielding structure on the first substrate is at least partially overlapped with a first overlapping region, and an orthographic projection of the second light shielding structure on the first substrate is at least partially overlapped with a second overlapping region; and the first overlapping region is an overlapping region between orthographic projections of a plurality of first electrodes and a plurality of third electrodes on the first substrate, and the second overlapping region is an overlapping region between orthographic projections of a plurality of second electrodes and a plurality of third electrodes on the first substrate.

2. The display substrate according to claim 1, wherein for each pixel structure, the first overlapping region is located within a range of the orthographic projection of the first light shielding structure on the first substrate, and the second overlapping region is located within a range of the orthographic projection of the second light shielding structure on the first substrate.

3. The display substrate according to claim 1, wherein each of the first electrode regions further comprises: a first connection electrode extending along the second direction and a second connection electrode extending along the second direction;

for each pixel structure, the first connection electrode is connected with the plurality of first electrodes and is of an integral structure with the plurality of first electrodes; and the second connection electrode is connected with the plurality of second electrodes and is of an integral structure with the plurality of second electrodes.

4. The display substrate according to claim 3, for each pixel structure, a region in which the first electrode, the second electrode, and the third electrode are arranged constitutes a display region, and orthographic projections of the first connection electrode and the second connection electrode on the first substrate are not overlapped with an orthographic projection of the display region on the first substrate; or the first connection electrode and the second connection electrode are disposed on the first substrate and in a region between orthographic projections of two adjacent third electrodes that are located on the second substrate on the first substrate.

5. The display substrate according to claim 1, wherein the first substrate is further provided with a third conductive layer; the third conductive layer is located on a side of the first light shielding layer away from the second substrate;
the third conductive layer comprises a plurality of signal drive regions arranged in an array, and each of the signal drive regions comprises a first drive signal line and a second drive signal line extending along the second direction; and
for each pixel structure, the first drive signal line is electrically connected with the plurality of first electrodes, and the second drive signal line is electrically connected with the plurality of second electrodes.

6. The display substrate according to claim 5, wherein the first substrate is further provided with a first planarization layer, an insulation layer, and a first alignment layer; the first planarization layer is located between the first conductive layer and the first light shielding layer, the insulation layer is located between the first light shielding layer and the third conductive layer, and the first alignment layer is located on a side of the first conductive layer close to the second substrate;
the first planarization layer and the insulation layer are provided with a first via exposing the first drive signal line and a second via exposing the second drive signal line;
for each pixel structure, the plurality of first electrodes are connected with the first drive signal line through the first via, and the plurality of second electrodes are connected with the second drive signal line through the second via; and
for each pixel structure, there is no overlapping region between orthographic projections of the first via and the second via on the first substrate and the orthographic projection of the first light shielding structure on the first substrate.

7. The display substrate according to claim 6, wherein lengths of the first via and the second via along the first direction are 5 microns to 20 microns; lengths of the first via and the second via along the second direction are 5 microns to 20 microns;
a quantity of first vias is plural, and a quantity of second vias is plural;
for each pixel structure, each of the first electrodes is electrically connected with the first drive signal line through at least one of the first vias; and each of the second electrodes is electrically connected with the second drive signal line through at least one of the second vias.

8. The display substrate according to claim 1, wherein for each pixel structure, distances between adjacent first electrodes are equal, distances between adjacent second electrodes are equal, and distances between adjacent third electrodes are equal;
for each pixel structure, the second electrode is located between two adjacent first electrodes; and the first electrode is located between two adjacent second electrodes.

9. The display substrate according to claim 1, further comprising: a post spacer disposed between the first substrate and the second substrate, the post spacer is disposed to support the first substrate and the second substrate; and the second substrate is further provided with a second planarization layer and a second alignment layer, wherein the second planarization layer is located between the second light shielding layer and the second conductive layer, and the second alignment layer is located on a side of the second conductive layer close to the first substrate.

10. The display substrate according to claim 1, wherein shapes of the first electrode and the second electrode comprise strip shapes, and a shape of the third electrode comprises a strip shape; lengths of the first electrode and the second electrode along the second direction are 80 microns to 100 microns; a length of the third electrode along the first direction is 80 microns to 100 microns;
lengths of the first light shielding structure and the second light shielding structure along the first direction are 90 microns to 120 microns, and lengths of the first light shielding structure and the second light shielding structure along the second direction are 90 microns to 120 microns;
a length of the first electrode along the second direction is smaller than a length of the first light shielding structure along the second direction by 5 microns to 30 microns, and the length of the third electrode along the first direction is smaller than a length of the first light shielding structure along the first direction by 5 microns to 30 microns; and
a length of the second electrode along the second direction is smaller than a length of the second light shielding structure along the second direction by 5 microns to 30 microns, and the length of the third electrode along the first direction is smaller than a length of the second light shielding structure along the first direction by 5 microns to 30 microns.

11. The display substrate according to claim 1, wherein the liquid crystal layer is a polymer stabilized liquid crystal layer; and
the first electrode, the second electrode, and the third electrode are transparent electrodes.

12. The display substrate according to claim 1, wherein for each pixel structure, a sum of areas of all the first light shielding structures and all the second light shielding structures is 15% to 35% of a total area of one pixel structure.

13. The display substrate according to claim 1, wherein the first light shielding layer further comprises a third light shielding region, and the second light shielding layer further comprises a fourth light shielding region; the third light shielding region and the fourth light shielding region are located between adjacent pixel structures, wherein the third light shielding region comprises a plurality of third light shielding structures arranged in an array, and the fourth light shielding region comprises a plurality of fourth light shielding structures arranged in an array; and
orthographic projections of a plurality of third light shielding structures on the first substrate are not overlapped with an orthographic projection of a pixel structure on the first substrate, and orthographic projections of a plurality of fourth light shielding structures on the first substrate are not overlapped with the orthographic projection of the pixel structure on the first substrate.

14. The display substrate according to claim 13, wherein fabrication materials of the first light shielding structure, the second light shielding structure, the third light shielding structure, and the fourth light shielding structure comprise optical resin, black resin, or chromium.

15. A display apparatus, comprising a display substrate according to claim 1.

16. A preparation method of a display substrate, comprising:

providing a first substrate;

forming a first light shielding layer and a first conductive layer sequentially on the first substrate; wherein the first conductive layer comprises a plurality of first electrode regions arranged in an array, and each of the first electrode regions comprises at least one first electrode arranged along a second direction and at least one second electrode arranged along the second direction, wherein the first electrode and the second electrode extend along a first direction, and the at least one first electrode and the at least one second electrode are alternately disposed; the first light shielding layer comprises a plurality of first light shielding regions arranged in an array, and each of the first light shielding regions comprises a plurality of first light shielding structures arranged in an array;

providing a second substrate;

forming a second light shielding layer and a second conductive layer sequentially on the second substrate; wherein the second conductive layer comprises a plurality of second electrode regions arranged in an array, each of the second electrode regions comprises at least one third electrode arranged along the first direction, and the third electrode extends along the second direction, wherein the first direction intersects with the second direction; the second light shielding layer comprises a plurality of second light shielding regions arranged in an array, and each of the second light shielding regions comprises a plurality of second light shielding structures arranged in an array;

disposing a liquid crystal layer on the first substrate on which the first light shielding layer and the first conductive layer are formed or on the second substrate on which the second light shielding layer and the second conductive layer are formed;

cell aligning the first substrate and the second substrate to form the display substrate, wherein the display substrate comprises a plurality of pixel structures arranged in an array, each of the pixel structures comprises the first electrode region, the second electrode region, the first light shielding region, and the second light shielding region; for each pixel structure: an orthographic projection of the first light shielding structure on the first substrate is at least partially overlapped with a first overlapping region, and an orthographic projection of the second light shielding structure on the first substrate is at least partially overlapped with a second overlapping region; and the first overlapping region is an overlapping region between orthographic projections of a plurality of first electrodes and a plurality of third electrodes on the first substrate, and the second overlapping region is an overlapping region between orthographic projections of a plurality of second electrodes and a plurality of third electrodes on the first substrate.

17. The display substrate according to claim 2, further comprising: a post spacer disposed between the first substrate and the second substrate, the post spacer is disposed to support the first substrate and the second substrate; and the second substrate is further provided with a second planarization layer and a second alignment layer, wherein the second planarization layer is located between the second light shielding layer and the second conductive layer, and the second alignment layer is located on a side of the second conductive layer close to the first substrate.

18. The display substrate according to claim 3, further comprising: a post spacer disposed between the first substrate and the second substrate, the post spacer is disposed to support the first substrate and the second substrate; and the second substrate is further provided with a second planarization layer and a second alignment layer, wherein the second planarization layer is located between the second light shielding layer and the second conductive layer, and the second alignment layer is located on a side of the second conductive layer close to the first substrate.

19. The display substrate according to claim 2, wherein shapes of the first electrode and the second electrode comprise strip shapes, and a shape of the third electrode comprises a strip shape; lengths of the first electrode and the second electrode along the second direction are 80 microns to 100 microns; a length of the third electrode along the first direction is 80 microns to 100 microns;

lengths of the first light shielding structure and the second light shielding structure along the first direction are 90 microns to 120 microns, and lengths of the first light shielding structure and the second light shielding structure along the second direction are 90 microns to 120 microns;

a length of the first electrode along the second direction is smaller than a length of the first light shielding structure along the second direction by 5 microns to 30 microns, and the length of the third electrode along the first direction is smaller than a length of the first light shielding structure along the first direction by 5 microns to 30 microns; and a length of the second electrode along the second direction is smaller than a length of the second light shielding structure along the second direction by 5 microns to 30 microns, and the length of the third electrode along the first direction is smaller than a length of the second light shielding structure along the first direction by 5 microns to 30 microns.

20. The display substrate according to claim 3, wherein shapes of the first electrode and the second electrode comprise strip shapes, and a shape of the third electrode comprises a strip shape; lengths of the first electrode and the second electrode along the second direction are 80 microns to 100 microns; a length of the third electrode along the first direction is 80 microns to 100 microns;

lengths of the first light shielding structure and the second light shielding structure along the first direction are 90 microns to 120 microns, and lengths of the first light shielding structure and the second light shielding structure along the second direction are 90 microns to 120 microns;

a length of the first electrode along the second direction is smaller than a length of the first light shielding structure along the second direction by 5 microns to 30 microns, and the length of the third electrode along the first direction is smaller than a length of the first light shielding structure along the first direction by 5 microns to 30 microns; and a length of the second electrode along the second direction is smaller than a length of the second light shielding structure along the second direction by 5 microns to 30 microns, and the length of the third electrode along the first direction is smaller than a length of the second light shielding structure along the first direction by 5 microns to 30 microns.

* * * * *